United States Patent
Mountainland et al.

(10) Patent No.: US 12,497,569 B2
(45) Date of Patent: Dec. 16, 2025

(54) METHOD AND SYSTEM FOR MIXING CATALYST PRECURSOR INTO HEAVY OIL USING A HIGH BOILING HYDROCARBON DILUENT

(71) Applicant: HYDROCARBON TECHNOLOGY & INNOVATION, LLC, Lawrenceville, NJ (US)

(72) Inventors: David M. Mountainland, Princeton, NJ (US); Brett M. Silverman, Salt Lake City, UT (US); Paul Sadelski, Plainsboro Township, NJ (US)

(73) Assignee: HYDROCARBON TECHNOLOGY & INNOVATION, LLC, Lawrenceville, NJ (US)

( * ) Notice: Subject to any disclaimer, the term of this patent is extended or adjusted under 35 U.S.C. 154(b) by 226 days.

(21) Appl. No.: 18/200,467

(22) Filed: May 22, 2023

(65) Prior Publication Data
US 2023/0381727 A1 Nov. 30, 2023

Related U.S. Application Data

(60) Provisional application No. 63/346,116, filed on May 26, 2022.

(51) Int. Cl.
*C10G 49/12* (2006.01)
*B01F 23/50* (2022.01)
(Continued)

(52) U.S. Cl.
CPC ............ *C10G 49/12* (2013.01); *B01F 23/511* (2022.01); *B01F 23/581* (2022.01); *B01F 23/59* (2022.01);
(Continued)

(58) Field of Classification Search
CPC .............. C10G 45/14–15; C10G 45/56; C10G 47/24–26; C10G 49/10–12; B01F 23/581; B01F 23/59; B01F 23/702
See application file for complete search history.

(56) References Cited

U.S. PATENT DOCUMENTS

| | | |
|---|---|---|
| 2,850,552 A | 9/1958 | Ogle |
| 3,019,180 A | 1/1962 | Schreiner et al. |

(Continued)

FOREIGN PATENT DOCUMENTS

| | | |
|---|---|---|
| CA | 2004882 A1 | 6/1991 |
| CA | 1295112 C | 2/1992 |

(Continued)

OTHER PUBLICATIONS

Aspen Hydrocracke(Trademark): A simulation system for monitoring, planning and optimizing hydrocracking and hydrotreating units, www.aspentec.com/brochures/hydrocracker.pdf (2001).

(Continued)

*Primary Examiner* — Renee Robinson
(74) *Attorney, Agent, or Firm* — Workman Nydegger

(57) ABSTRACT

System and method for mixing a catalyst precursor into heavy oil using a high boiling hydrocarbon diluent to form a diluted precursor mixture, which is mixed with the heavy oil feedstock to form a conditioned feedstock, which is subsequently heated to decompose the precursor and form dispersed metal sulfide catalyst particles in situ. Because the high boiling hydrocarbon diluent is typically at a temperature above the decomposition temperature of the catalyst precursor, it is first feed through a cooler to reduce its temperature to avoid premature decomposition of the catalyst precursor. The high boiling hydrocarbon diluent may include a portion of the heavy oil feedstock, a portion of the conditioned feedstock, a vacuum tower bottoms product, or other high boiling hydrocarbon material having a boiling (Continued)

point higher than 524° C. A portion of the diluent may optionally include a medium boiling hydrocarbon material having a boiling point less than 524° C.

23 Claims, 13 Drawing Sheets

(51) Int. Cl.
    *B01F 23/70*           (2022.01)
    *B01J 8/00*             (2006.01)
    *C10G 45/14*           (2006.01)
    *C10G 47/26*           (2006.01)
    *B01F 101/40*          (2022.01)

(52) U.S. Cl.
    CPC ............ *B01F 23/702* (2022.01); *B01J 8/001* (2013.01); *B01J 8/0015* (2013.01); *C10G 45/14* (2013.01); *C10G 47/26* (2013.01); *B01F 2101/40* (2022.01); *B01J 2208/00876* (2013.01); *C10G 2300/1077* (2013.01); *C10G 2300/4006* (2013.01); *C10G 2300/4075* (2013.01)

(56) References Cited

U.S. PATENT DOCUMENTS

| | | |
|---|---|---|
| 3,161,585 A | 12/1964 | Gleim et al. |
| 3,254,017 A | 5/1966 | Arey et al. |
| 3,267,021 A | 8/1966 | Gould |
| 3,297,563 A | 1/1967 | Doumani |
| 3,349,713 A | 10/1967 | Fassbender |
| 3,362,972 A | 1/1968 | Wallington |
| 3,578,690 A | 5/1971 | Becker |
| 3,595,891 A | 7/1971 | Cavitt |
| 3,622,497 A | 11/1971 | Gleim |
| 3,622,498 A | 11/1971 | Stolfa et al. |
| 3,694,351 A | 9/1972 | White |
| 3,694,352 A | 9/1972 | Gleim |
| 3,816,020 A | 6/1974 | Ogles |
| 3,870,623 A | 3/1975 | Johnson et al. |
| 3,892,389 A | 7/1975 | Contastin |
| 3,915,842 A | 10/1975 | Gatsis |
| 3,919,074 A | 11/1975 | Gatsis |
| 3,953,362 A | 4/1976 | Lines et al. |
| 3,983,028 A | 9/1976 | McCollum et al. |
| 3,992,285 A | 11/1976 | Hutchings |
| 4,022,681 A | 5/1977 | Sheng et al. |
| 4,066,530 A | 1/1978 | Aldridge et al. |
| 4,066,561 A | 1/1978 | Nnadi |
| 4,067,798 A | 1/1978 | Hauschildt et al. |
| 4,067,799 A | 1/1978 | Bearden et al. |
| 4,068,830 A | 1/1978 | Gray |
| 4,077,867 A | 3/1978 | Aldridge et al. |
| 4,083,803 A | 4/1978 | Oswald et al. |
| 4,125,455 A | 11/1978 | Herbstman |
| 4,134,825 A | 1/1979 | Bearden et al. |
| 4,148,750 A | 4/1979 | Pine |
| 4,151,070 A | 4/1979 | Allan et al. |
| 4,169,038 A | 9/1979 | Metrailer et al. |
| 4,178,227 A | 12/1979 | Aldridge et al. |
| 4,181,601 A | 1/1980 | Sze |
| 4,191,636 A | 3/1980 | Ando et al. |
| 4,192,735 A | 3/1980 | Aldridge et al. |
| 4,196,072 A | 4/1980 | Aldridge et al. |
| 4,226,742 A | 10/1980 | Bearden et al. |
| 4,252,634 A | 2/1981 | Khulbe et al. |
| 4,271,323 A | 6/1981 | Durand et al. |
| 4,285,804 A | 8/1981 | Jacquin et al. |
| 4,298,454 A | 11/1981 | Aldridge et al. |
| 4,305,808 A | 12/1981 | Bowes et al. |
| 4,313,818 A | 2/1982 | Aldridge et al. |
| 4,325,802 A | 4/1982 | Porter et al. |
| 4,338,183 A | 7/1982 | Gatsis |
| 4,352,729 A | 10/1982 | Jacquin et al. |
| 4,370,221 A | 1/1983 | Patmore et al. |
| 4,389,301 A | 6/1983 | Dahlberg et al. |
| 4,411,768 A | 10/1983 | Unger et al. |
| 4,420,008 A | 12/1983 | Shu |
| 4,422,927 A | 12/1983 | Kowalczyk et al. |
| 4,422,960 A | 12/1983 | Shiroto et al. |
| 4,427,532 A | 1/1984 | Varghese |
| 4,430,207 A | 2/1984 | Kukes |
| 4,435,314 A | 3/1984 | Van et al. |
| 4,452,265 A | 6/1984 | Loennebring |
| 4,454,023 A | 6/1984 | Lutz |
| 4,455,218 A | 6/1984 | Dymock et al. |
| 4,457,831 A | 7/1984 | Gendler |
| 4,465,630 A | 8/1984 | Akashi et al. |
| 4,467,049 A | 8/1984 | Yoshii et al. |
| 4,485,004 A | 11/1984 | Fisher et al. |
| 4,485,008 A | 11/1984 | Maa et al. |
| 4,508,616 A | 4/1985 | Larrauri et al. |
| 4,513,098 A | 4/1985 | Tsao |
| 4,525,267 A | 6/1985 | Inooka |
| 4,551,230 A | 11/1985 | Kukes et al. |
| 4,557,823 A | 12/1985 | Kukes et al. |
| 4,557,824 A | 12/1985 | Kukes et al. |
| 4,561,964 A | 12/1985 | Singhal et al. |
| 4,564,441 A | 1/1986 | Kukes et al. |
| 4,567,156 A | 1/1986 | Bearden et al. |
| 4,568,657 A | 2/1986 | Sepulveda et al. |
| 4,578,181 A | 3/1986 | Perouane et al. |
| 4,579,646 A | 4/1986 | Grosboll et al. |
| 4,581,344 A | 4/1986 | Ledoux et al. |
| 4,582,432 A | 4/1986 | Mehta |
| 4,585,545 A | 4/1986 | Yancey et al. |
| 4,590,172 A | 5/1986 | Isaacs |
| 4,592,827 A | 6/1986 | Galiasso et al. |
| 4,592,830 A | 6/1986 | Howell et al. |
| 4,606,809 A | 8/1986 | Garg |
| 4,608,152 A | 8/1986 | Howell et al. |
| 4,613,427 A | 9/1986 | Sepulveda et al. |
| 4,614,726 A | 9/1986 | Walters et al. |
| 4,626,340 A | 12/1986 | Galiasso et al. |
| 4,633,001 A | 12/1986 | Cells |
| 4,652,311 A | 3/1987 | Gulla et al. |
| 4,652,647 A | 3/1987 | Schlosberg et al. |
| 4,674,885 A | 6/1987 | Erwin et al. |
| 4,676,886 A | 6/1987 | Rahbe et al. |
| 4,678,557 A | 7/1987 | Rodriguez et al. |
| 4,693,991 A | 9/1987 | Bjornson et al. |
| 4,695,369 A | 9/1987 | Garg et al. |
| 4,701,435 A | 10/1987 | Garcia et al. |
| 4,707,245 A | 11/1987 | Baldasarri et al. |
| 4,707,246 A | 11/1987 | Gardner et al. |
| 4,710,486 A | 12/1987 | Lopez et al. |
| 4,713,167 A | 12/1987 | Reno et al. |
| 4,716,142 A | 12/1987 | Laine et al. |
| 4,724,069 A | 2/1988 | Aldag et al. |
| 4,734,186 A | 3/1988 | Parrott et al. |
| 4,740,295 A | 4/1988 | Bearden et al. |
| 4,746,419 A | 5/1988 | Peck et al. |
| 4,762,607 A | 8/1988 | Aldridge et al. |
| 4,762,812 A | 8/1988 | Lopez et al. |
| 4,762,814 A | 8/1988 | Parrott et al. |
| 4,764,266 A | 8/1988 | Chen et al. |
| 4,765,882 A | 8/1988 | Aldridge et al. |
| 4,770,764 A | 9/1988 | Ohtake et al. |
| 4,772,378 A | 9/1988 | Miyauchi et al. |
| 4,772,387 A | 9/1988 | Simoni |
| 4,802,972 A | 2/1989 | Kukes et al. |
| 4,808,007 A | 2/1989 | King |
| 4,812,228 A | 3/1989 | Angevine et al. |
| 4,824,611 A | 4/1989 | Cells |
| 4,824,821 A | 4/1989 | Lopez et al. |
| 4,834,865 A | 5/1989 | Kukes et al. |
| 4,837,193 A | 6/1989 | Akizuki et al. |
| 4,851,107 A | 7/1989 | Kretschmar et al. |
| 4,851,109 A | 7/1989 | Chen et al. |
| 4,857,496 A | 8/1989 | Lopez et al. |
| 4,859,309 A | 8/1989 | De et al. |
| 4,863,887 A | 9/1989 | Ohtake et al. |

(56) References Cited

U.S. PATENT DOCUMENTS

| | | |
|---|---|---|
| 4,959,140 A | 9/1990 | Kukes et al. |
| 4,963,247 A | 10/1990 | Belinko et al. |
| 4,970,190 A | 11/1990 | Lopez et al. |
| 4,983,273 A | 1/1991 | Kennedy et al. |
| 4,983,558 A | 1/1991 | Born et al. |
| 5,013,427 A | 5/1991 | Mosby et al. |
| 5,017,535 A | 5/1991 | Schoonhoven et al. |
| 5,017,712 A | 5/1991 | Usui et al. |
| 5,038,392 A | 8/1991 | Morris et al. |
| 5,039,392 A | 8/1991 | Bearden et al. |
| 5,055,174 A | 10/1991 | Howell et al. |
| 5,080,777 A | 1/1992 | Aegerter et al. |
| 5,094,991 A | 3/1992 | Lopez et al. |
| 5,108,581 A | 4/1992 | Aldridge et al. |
| 5,114,900 A | 5/1992 | King |
| 5,134,108 A | 7/1992 | Thakur et al. |
| 5,154,818 A | 10/1992 | Harandi et al. |
| 5,162,282 A | 11/1992 | Lopez et al. |
| 5,164,075 A | 11/1992 | Lopez |
| 5,166,118 A | 11/1992 | Kretschmar et al. |
| 5,171,916 A | 12/1992 | Le et al. |
| 5,178,749 A | 1/1993 | Lopez et al. |
| 5,191,131 A | 3/1993 | Takahata et al. |
| 5,254,240 A | 10/1993 | Galiasso et al. |
| 5,281,328 A | 1/1994 | Degnan et al. |
| 5,320,500 A | 6/1994 | Cholet |
| 5,332,489 A | 7/1994 | Veluswamy |
| 5,332,709 A | 7/1994 | Nappier et al. |
| 5,358,634 A | 10/1994 | Rankel |
| 5,364,524 A | 11/1994 | Partridge et al. |
| 5,372,705 A | 12/1994 | Bhattacharya et al. |
| 5,374,348 A | 12/1994 | Sears et al. |
| 5,409,595 A | 4/1995 | Harandi et al. |
| 5,435,908 A | 7/1995 | Nelson et al. |
| 5,452,954 A | 9/1995 | Handke et al. |
| 5,460,714 A | 10/1995 | Fixari et al. |
| 5,474,977 A | 12/1995 | Gatsis |
| 5,578,197 A | 11/1996 | Cyr et al. |
| 5,597,236 A | 1/1997 | Fasano |
| 5,622,616 A | 4/1997 | Porter et al. |
| 5,865,537 A | 2/1999 | Streiff et al. |
| 5,866,501 A | 2/1999 | Pradhan et al. |
| 5,868,923 A | 2/1999 | Porter et al. |
| 5,871,638 A | 2/1999 | Pradhan et al. |
| 5,913,324 A | 6/1999 | Signer |
| 5,916,432 A | 6/1999 | McFarlane et al. |
| 5,925,235 A | 7/1999 | Habib |
| 5,932,090 A | 8/1999 | Marchionna et al. |
| 5,935,419 A | 8/1999 | Khan et al. |
| 5,954,945 A | 9/1999 | Cayton et al. |
| 5,962,364 A | 10/1999 | Wilson et al. |
| 5,972,202 A | 10/1999 | Benham et al. |
| 6,004,453 A | 12/1999 | Benham et al. |
| 6,059,957 A | 5/2000 | Khan et al. |
| 6,068,758 A | 5/2000 | Strausz |
| 6,086,749 A | 7/2000 | Kramer et al. |
| 6,090,858 A | 7/2000 | El-Sayed |
| 6,093,824 A | 7/2000 | Reichle et al. |
| 6,136,179 A | 10/2000 | Sherwood et al. |
| 6,139,723 A | 10/2000 | Pelrine et al. |
| 6,190,542 B1 | 2/2001 | Comolli et al. |
| 6,214,195 B1 | 4/2001 | Yadav et al. |
| 6,217,746 B1 | 4/2001 | Thakkar et al. |
| 6,239,054 B1 | 5/2001 | Shukis et al. |
| 6,270,654 B1 | 8/2001 | Colyar et al. |
| 6,274,530 B1 | 8/2001 | Cayton et al. |
| 6,277,270 B1 | 8/2001 | Morel et al. |
| 6,309,537 B1 | 10/2001 | Harle et al. |
| 6,342,224 B1 | 1/2002 | Bruck et al. |
| 6,379,532 B1 | 4/2002 | Hoehn et al. |
| 6,454,932 B1 | 9/2002 | Baldassari et al. |
| 6,455,594 B1 | 9/2002 | Tsuji |
| 6,462,095 B1 | 10/2002 | Boensel et al. |
| 6,550,960 B2 | 4/2003 | Catalfamo et al. |
| 6,596,155 B1 | 7/2003 | Gates et al. |
| 6,660,157 B2 | 12/2003 | Que et al. |
| 6,686,308 B2 | 2/2004 | Mao et al. |
| 6,698,197 B1 | 3/2004 | Peterson |
| 6,698,917 B2 | 3/2004 | Etchells et al. |
| 6,712,955 B1 | 3/2004 | Hou et al. |
| 6,783,661 B1 | 8/2004 | Briot et al. |
| 6,797,153 B1 | 9/2004 | Fukuyama et al. |
| 6,884,340 B1 | 4/2005 | Bogdan |
| 6,916,762 B2 | 7/2005 | Shibuya et al. |
| 7,011,807 B2 | 3/2006 | Zhou et al. |
| 7,090,767 B2 | 8/2006 | Kaminsky et al. |
| 7,285,698 B2 | 10/2007 | Liu et al. |
| 7,449,103 B2 | 11/2008 | Lott et al. |
| 7,517,446 B2 | 4/2009 | Lott et al. |
| 7,578,928 B2 | 8/2009 | Lott et al. |
| 7,815,870 B2 | 10/2010 | Lott et al. |
| 7,951,745 B2 | 5/2011 | Zhou et al. |
| 8,034,232 B2 | 10/2011 | Lott et al. |
| 8,142,645 B2 | 3/2012 | Zhou et al. |
| 8,303,082 B2 | 11/2012 | Menzel et al. |
| 8,303,802 B2 | 11/2012 | Lott et al. |
| 8,309,041 B2 | 11/2012 | Lott et al. |
| 8,431,016 B2 | 4/2013 | Lott et al. |
| 8,435,400 B2 | 5/2013 | Kou et al. |
| 8,440,071 B2 | 5/2013 | Lott et al. |
| 8,445,399 B2 | 5/2013 | Wu et al. |
| 8,557,105 B2 | 10/2013 | Lott et al. |
| 8,673,130 B2 | 3/2014 | Lott et al. |
| 9,605,215 B2 | 3/2017 | Lott et al. |
| 2002/0179493 A1 | 12/2002 | Etter |
| 2003/0094400 A1 | 5/2003 | Levy et al. |
| 2003/0171207 A1 | 9/2003 | Shih et al. |
| 2004/0013601 A1 | 1/2004 | Butz et al. |
| 2004/0147618 A1 | 7/2004 | Lee et al. |
| 2005/0109674 A1 | 5/2005 | Klein |
| 2005/0241991 A1 | 11/2005 | Lott et al. |
| 2005/0241992 A1 | 11/2005 | Lott et al. |
| 2005/0241993 A1 | 11/2005 | Lott et al. |
| 2005/0258073 A1 | 11/2005 | Oballa et al. |
| 2005/0279670 A1 | 12/2005 | Long et al. |
| 2006/0060501 A1 | 3/2006 | Gauthier et al. |
| 2006/0079396 A1 | 4/2006 | Saito |
| 2006/0175229 A1 | 8/2006 | Montanari et al. |
| 2006/0201854 A1 | 9/2006 | Lott |
| 2006/0224000 A1 | 10/2006 | Papp et al. |
| 2006/0254956 A1 | 11/2006 | Khan |
| 2006/0289340 A1 | 12/2006 | Brownscombe et al. |
| 2007/0012595 A1 | 1/2007 | Brownscombe et al. |
| 2007/0029228 A1 | 2/2007 | Aoki et al. |
| 2007/0108100 A1 | 5/2007 | Satchell |
| 2007/0131587 A1 | 6/2007 | Fukuyama et al. |
| 2007/0138059 A1 | 6/2007 | Farshid et al. |
| 2007/0158236 A1 | 7/2007 | Zhou et al. |
| 2007/0158238 A1 | 7/2007 | Wu et al. |
| 2007/0158239 A1 | 7/2007 | Satchell |
| 2007/0163921 A1 | 7/2007 | Keusenkothen et al. |
| 2007/0175797 A1 | 8/2007 | Iki et al. |
| 2007/0209965 A1 | 9/2007 | Duddy et al. |
| 2008/0107881 A1 | 5/2008 | Nakashiba et al. |
| 2009/0152165 A1 | 6/2009 | Etter |
| 2009/0159505 A1 | 6/2009 | Da et al. |
| 2009/0308792 A1 | 12/2009 | Wu et al. |
| 2009/0310435 A1 | 12/2009 | Lott |
| 2010/0065472 A1 | 3/2010 | Chabot |
| 2010/0122931 A1 | 5/2010 | Zimmerman et al. |
| 2011/0017637 A1 | 1/2011 | Reynolds et al. |
| 2011/0017641 A1 | 1/2011 | Gupta et al. |
| 2011/0226667 A1 | 9/2011 | Lott et al. |
| 2012/0152805 A1 | 6/2012 | Chabot et al. |
| 2012/0172203 A1 | 7/2012 | Mironov et al. |
| 2013/0068858 A1 | 3/2013 | Nuzzo et al. |
| 2013/0075304 A1 | 3/2013 | Chang |
| 2013/0233765 A1 | 9/2013 | Lott et al. |
| 2014/0027344 A1 | 1/2014 | Harris et al. |
| 2014/0093433 A1 | 4/2014 | Lott et al. |
| 2014/0291203 A1 | 10/2014 | Molinari et al. |
| 2015/0361360 A1 | 12/2015 | Harris et al. |
| 2017/0066978 A1 | 3/2017 | Lott et al. |

(56) References Cited

U.S. PATENT DOCUMENTS

| | | |
|---|---|---|
| 2017/0081599 A1 | 3/2017 | Mountainland et al. |
| 2017/0081600 A1 | 3/2017 | Mountainland et al. |
| 2020/0115643 A1* | 4/2020 | Rueter .................... B01J 8/005 |

FOREIGN PATENT DOCUMENTS

| | | |
|---|---|---|
| CA | 2088402 A1 | 7/1994 |
| CA | 2579528 A1 | 9/2007 |
| CN | 1219570 | 6/1999 |
| CN | 1295112 A | 5/2001 |
| CN | 1448482 A | 10/2003 |
| CN | 2579528 Y | 10/2003 |
| CN | 1933766 A | 3/2007 |
| CN | 1950484 A | 4/2007 |
| CN | 1966618 A | 5/2007 |
| CN | 101015440 A | 8/2007 |
| CN | 202960636 U | 6/2013 |
| CN | 103228355 A | 7/2013 |
| CN | 104349804 A | 2/2015 |
| CN | 104560158 A | 4/2015 |
| CN | 105518109 A | 4/2016 |
| CN | 106535954 A | 3/2017 |
| CN | 108531215 A | 9/2018 |
| CN | 108699451 A | 10/2018 |
| DE | 2324441 A1 | 12/1973 |
| DE | 2315114 A1 | 10/1974 |
| DE | 2421934 A1 | 11/1974 |
| EA | 201590288 A1 | 6/2015 |
| EP | 0199399 A2 | 10/1986 |
| EP | 0546686 A1 | 6/1993 |
| EP | 0559399 A1 | 9/1993 |
| EP | 0732389 A2 | 9/1996 |
| EP | 0753846 A1 | 1/1997 |
| EP | 1043069 A1 | 10/2000 |
| EP | 1753846 A2 | 2/2007 |
| EP | 1893666 A1 | 3/2008 |
| EP | 2811006 A1 | 12/2014 |
| EP | 3369801 A1 | 9/2018 |
| GB | 1047698 A | 11/1966 |
| GB | 1412155 A | 10/1975 |
| GB | 1455663 A | 11/1976 |
| JP | 59-050276 A | 6/1984 |
| JP | 59-108091 A | 6/1984 |
| JP | 60-044587 A | 3/1985 |
| JP | 61-195155 A | 8/1986 |
| JP | 62-039634 B1 | 8/1987 |
| JP | 63-027596 A | 2/1988 |
| JP | 01-165692 A | 6/1989 |
| JP | 05-501829 A | 4/1993 |
| JP | 05-339357 A | 12/1993 |
| JP | 06-009966 A | 1/1994 |
| JP | 06-287574 A | 10/1994 |
| JP | 06-346064 A | 12/1994 |
| JP | 07-062355 A | 3/1995 |
| JP | 07-090282 A | 4/1995 |
| JP | 08-325580 A | 12/1996 |
| JP | 2863858 B2 | 3/1999 |
| JP | 2000-502146 A | 2/2000 |
| JP | 2001-165692 A | 6/2001 |
| JP | 2003-193074 A | 7/2003 |
| JP | 2007-535604 A | 12/2007 |
| JP | 2009-541499 A | 11/2009 |
| JP | 2011-502204 A | 1/2011 |
| JP | 2015-527452 A | 9/2015 |
| JP | 2018-532839 A | 11/2018 |
| KR | 10-2007-0018923 A | 2/2007 |
| KR | 10-1493631 B1 | 2/2015 |
| RU | 2181751 C2 | 4/2002 |
| WO | 92/00807 A1 | 1/1992 |
| WO | 97/23582 A1 | 7/1997 |
| WO | 97/29841 A2 | 8/1997 |
| WO | 97/34967 A1 | 9/1997 |
| WO | 00/01408 A2 | 1/2000 |
| WO | 00/75336 A2 | 12/2000 |
| WO | 01/01408 A1 | 1/2001 |
| WO | 01/41799 A1 | 6/2001 |
| WO | 2005/104749 A2 | 11/2005 |
| WO | 2005/104752 A2 | 11/2005 |
| WO | 2006/116913 A1 | 11/2006 |
| WO | 2006/132671 A1 | 12/2006 |
| WO | 2007/078622 A2 | 7/2007 |
| WO | 2007/106783 A2 | 9/2007 |
| WO | 2008/151792 A1 | 12/2008 |
| WO | 2008/151972 A2 | 12/2008 |
| WO | 2009/058785 A2 | 5/2009 |
| WO | 2010/033487 A2 | 3/2010 |
| WO | 2012/088585 A1 | 7/2012 |
| WO | 2017/053117 A1 | 3/2017 |

OTHER PUBLICATIONS

Chembiofinder.com, Scientific Database Gateway, Molecular Profile Report for cobalt benzoate, at least as early as Sep. 10, 2010.

Course: Chemical Technology (Organic) Module VI, Lecture 5 Catalytic Cracking: Fluid Catalytic Cracking and Hydrocracking downloaded Jun. 2019.

Criterion: Hydrocracking Process Description and CRITERION/ CEOLYST Hydrocracking Catalyst Applications, www.criterioncatalysts.com (2001).

Database CA [on line] Chemical Abstracts Service retrieved from STN Database accession No. 1991:42412.

Del Bianco et al. "Upgrading Heavy Oil Using Slurry Processes" Chemtech, Nov. 30, 1995 (Nov. 30, 1995), pp. 35-43.

Ex Parte Quayle Action received for U.S. Appl. No. 11/374,369, mailed on Sep. 21, 2020, 5 pages.

Hydrocracking of Liaohe Vacuum Residue With Bimeta:, Shen et al., Preprints of Symposia—American Chemical society, Division of Fuel Chemistry (1998), 43(3), 481-485, OCDEN: Psadfz, 1998,XP009117504.

Hyvahl, Significantly Improved RFCC Performance or Low Sulfur Fuel Oils Via Residue Hydrotreatment Axens IPF Group Technologies, pp. 1,2; (Jan. 2003).

Kressmann et al., "Improvements of Ebullated-Bed Technology for Upgrading Heavy", OIL & Gas Science and Technology, vol. 55, No. 4, 2000, pp. 397-406.

Lee, Sunggyu et al., Handook of Alternative Fuel Technologies, 2007, pp. 187-188.

Lewis, Richard J., Hawley's Condensed Chemical Dictionary, 15 Edition, 2007, p. 321.

Loti et al.: "(HC)3 Process-A Slurry Hydrocracking Technology Designed to Convert Bottoms of Heavy Oils" 7th UNITAR International Conference of Heavy Crude and Tar Sands, Beijing, Oct. 27, 1998 (1998-10-27) pp. 1-8.

Mcfarlane et al. "Dispersion and Activity of Inorganic Catalyst Precursor in Heavy Oil" Boston Congress ACS Energy and Fuel Diversification, p. 496, Aug. 31, 1998.

N. Panariti et al.: "petroleum Residue Upgrading with Dispered Catalysts Part 1. Catalysts Activity and Selctivity" Applied Catalysts A: General, vol. 204, Mar. 31, 2000 (Mar. 1, 2000) pp. 203-213.

OCR Moving Bed Technology for the Future, pp. 1-2 (at least as early as 2004).

Office Action received for EA Patent Application No. 201892721, mailed on Jul. 8, 2020, 8 pages (4 pages of English Translation and 4 pages of Original Document).

Panariti et al., "Petroleum residue upgrading with dispersed catalysts Part2. Effect of operating conditions", Mar. 31, 2000, pp. 215-222.

Papaioannou et al., "Alkali-Metal- and Alkaline-Earth-Promoted Catalysts from Coal Liquefaction Applicatoins", Energy & Fuels, vol. 4, No. 1, pp. 38-42 (1990).

Plain et al., "Options for Resid Conversion", Axens IPF Group Technologies, pp. 1-10 (at least as early as 2004).

Rana et al., A Review of recent advances on process technologies for upgrading of heavy oils and residua, Sep. 7, 2016, full text, retrieved from http://www.sciencedirect.com/science/article/pii/S001623610600295X on Aug. 8, 2017.

(56) References Cited

OTHER PUBLICATIONS

Santori, R., et al., "Eni Slurry Technology: A Technology to Convert the Bottom of the Barrel to Transportation Fuels", 3rd Bottom of the Barrell Technology Conference & Exhibition (Oct. 2004).
Seader et al., "Perry's Chemical Engineers' Handbook", 7th Edition, Section 13—Distillation, 1997, 13-25.
U.S. Application Filed on Nov. 17, 2015, by Lott et al., U.S. Appl. No. 15/354,230.
U.S. Application Filed on Sep. 7, 2016, by Mountainland et al., U.S. Appl. No. 15/258,653.
U.S. Patent Application Filed on Aug. 26, 2015 by Harris et al., U.S. Appl. No. 14/836,792.
International Preliminary Report on Patentability received for PCT Patent Application No. PCT/US2023/023411, mailed on Dec. 5, 2024, 8 pages.
International Search Report and Written Opinion received for PCT Patent Application No. PCT/US23/23411, mailed on Sep. 29, 2023, 12 pages.

\* cited by examiner

METHOD AND SYSTEM FOR MIXING CATALYST PRECURSOR INTO HEAVY OIL USING A HIGH BOILING HYDROCARBON DILUENT

CROSS REFERENCE TO RELATED APPLICATION

This application claims the benefit of U.S. Provisional Application No. 63/346,116, filed May 26, 2022, which is incorporated by reference in its entirety.

BACKGROUND OF THE INVENTION

1. The Field of the Invention

The invention relates to methods and systems for mixing a catalyst precursor into a heavy oil feedstock using a high boiling hydrocarbon as a diluent prior to hydroprocessing.

2. The Relevant Technology

Converting heavy oil into useful end products involves extensive processing, such as reducing the boiling point of the heavy oil, increasing the hydrogen-to-carbon ratio, and removing impurities such as metals, sulfur, nitrogen, and coke precursors. Examples of hydrocracking processes using conventional heterogeneous catalysts to upgrade atmospheric tower bottoms and/or vacuum tower bottoms include fixed-bed hydroprocessing, ebullated-bed hydroprocessing, and moving-bed hydroprocessing. Hydrocracking can also be performed using a homogeneous catalyst in a slurry bed reactor.

There is an ever-increasing demand to more efficiently utilize low quality heavy oil feedstocks and extract fuel values therefrom. Low quality feedstocks are characterized as including relatively high quantities of hydrocarbons that nominally boil at or above 524° C. (975° F.). They also contain relatively high concentrations of asphaltenes, sulfur, nitrogen and metals. High boiling fractions derived from these low-quality feedstocks typically have a high molecular weight (often indicated by higher density and viscosity) and/or low hydrogen/carbon ratio, which is related to the presence of high concentrations of undesirable components, including asphaltenes and carbon residue. Asphaltenes and carbon residue are difficult to process and commonly cause fouling of conventional catalysts and hydroconversion equipment because they contribute to the formation of coke and sediment.

Low quality heavy oil feedstocks contain high concentrations of asphaltenes, carbon residue, sulfur, nitrogen, and metals. Examples include heavy crude, oil sands bitumen, and residuum left over from conventional refinery process. Residuum (or "resid") can refer to atmospheric tower bottoms and vacuum tower bottoms. Atmospheric tower bottoms can have a boiling point of at least 343° C. (650° F.) although it is understood that the cut point can vary among refineries and be as high as 380° C. (716° F.). Vacuum tower bottoms (also known as "resid pitch" or "vacuum residue") can have a boiling point of at least 524° C. (975° F.), although it is understood that the cut point can vary among refineries and be as high as 538° C. (1000° F.) or even 565° C. (1050° F.).

By way of comparison, Alberta light crude contains about 9 vol % vacuum residue, while Lloydminster heavy oil contains about 41 vol % vacuum residue, Cold Lake bitumen contains about 50 vol % vacuum residue, and Athabasca bitumen contains about 51 vol % vacuum residue. As a further comparison, a relatively light oil such as Dansk Blend from the North Sea region only contains about 15 vol % vacuum residue, while a lower-quality European oil such as Ural contains more than 30 vol % vacuum residue, and an oil such as Arab Medium is even higher, with about 40 vol % vacuum residue.

In a given ebullated bed system, the rate of production of converted products is often limited by fouling. When attempts are made to increase the production of converted products beyond a certain practical limit, the rate of fouling of mixers, heat exchangers, strainers, and other process equipment becomes too rapid, requiring more frequent shutdowns for maintenance and cleaning. A refinery operator typically relates the observed rate of equipment fouling to measurements of sediment production and arrives at an operating sediment limit, above which the refinery will avoid operating the ebullated bed hydrocracker. Thus, sediment production and equipment fouling place practical upper limits on conversion and the rate of production of converted products. Such problems are exacerbated when using lower quality heavy oil feedstocks.

Ebullated bed reactors that utilize a dual catalyst system comprised of a heterogeneous catalyst and a dispersed (e.g., metal sulfide) catalyst have been used to reduce equipment fouling and/or permit an increase in the rate of production of converted products. The success or failure of the dual catalyst system depends on several variables, including the particle size of the dispersed catalyst, which is the result of how it is formed. In the case of a metal sulfide catalyst formed from a catalyst precursor, the size and activity of the resulting catalyst is based primarily on how well it was dispersed into the heavy oil before thermally decomposing to form the active catalyst. Unless the catalyst precursor is adequately dispersed into the heavy oil prior to thermal decomposition, the resulting metal sulfide catalyst particles formed within the heavy oil feedstock will have low catalytic activity and may actually cause more equipment fouling, thus negating its effectiveness as a catalyst.

When employing a dispersed catalyst to enhance the performance of an ebullated bed hydroprocessing system, it is preferable to first prepare a diluted precursor mixture, which is thereafter mixed with the heavy oil feedstock. This is prepared by mixing a catalyst precursor with a hydrocarbon diluent, which is selected based on availability, cost, suitability for addition to the hydroprocessing process, and ability to solubilize the precursor. Such a diluted precursor mixture is more easily dispersed in the bulk of the heavy oil feedstock compared to directly mixing the precursor with the heavy oil feedstock. It can be difficult to adequately mix a catalyst precursor by simply adding it to the heavy oil feed, which yields a poorly mixed material that is likely to result in the formation of undesirably large or agglomerated catalyst particles when the dispersed catalyst is subsequently activated by heating of the feedstock mixture.

Some have used low and medium boiling hydrocarbons as a diluent for a catalyst precursor to form a diluted precursor mixture, which is then mixed into the heavy oil feedstock. Materials such as startup diesel, vacuum gas oil, atmospheric gas oil, decant oil, cycle oil, or the like are suitable medium boiling diluents. These materials have nominal boiling points in the range of 200° C. to 524° C. and have good solubility for the dispersed catalyst precursor. In addition, they are commonly processed and/or stored in a temperature range that makes them suitable for use as a diluent without further processing. This is because it is advantageous to use the diluent at a temperature below the decomposition temperature of the catalyst precursor, so that the precursor may be fully dissolved and dispersed before significant decomposition of the precursor and activation of dispersed metal sulfide catalyst particles occur.

However, in some hydroconversion facilities, materials of this type are either unavailable or are disadvantageous to use for this purpose. For example, the hydroconversion unit may be operating at or near its upper limit of capacity for processing heavy feedstock. The addition of a medium-boiling diluent to the process would displace a portion of the heavy feedstock, thereby reducing the effective capacity of the system for processing heavy feedstock below the required level. Another reason is that available medium boiling materials, which can be the converted products of the hydroconversion process, may have sufficient value for commercial sale, or for production of salable products, that they are effectively too expensive to enable their use as a diluent. Potential medium boiling materials may be required as feeds or intermediates for other processing systems in a commercial complex, making them unavailable for use as diluent.

Alternatively, using a medium boiling hydrocarbon diluent may cause processing problems. For example, the unit feedstock may already contain a limiting amount of medium-boiling material. Medium boiling components in the unit feed can contribute to sediment formation, which would be worsened by adding an additional quantity of medium boiling hydrocarbons to the feedstock via the diluted precursor mixture. There may be compatibility issues between the heavy oil feedstock and readily available medium boiling diluent sources, which can result in sedimentation and higher fouling in the hydroprocessing unit.

SUMMARY

Disclosed herein are methods and systems which are specially configured to mix a catalyst precursor into a high boiling hydrocarbon diluent to form a catalyst precursor mixture, which is then mixed with a heavy oil feedstock to form a conditioned feedstock preparatory to hydroprocessing the heavy oil using one or more hydroprocessing reactors. The conditioned feedstock can be heated to thermally decompose the catalyst precursor and form dispersed metal sulfide catalyst particles, which have high catalytic activity and promote beneficial upgrading reactions when hydroprocessing the heavy oil.

The disclosed methods and systems provide for efficient use of a dispersed catalyst in an ebullated bed hydroconversion system when a medium-boiling material is unavailable or disadvantageous as diluent for preparation of the diluted precursor mixture.

The high boiling hydrocarbon diluent can comprise one or more high boiling hydrocarbons, such as vacuum residue, vacuum tower bottoms, other heavy oil feedstocks, deasphalted heavy oil, and/or a side stream of the conditioned heavy oil feedstock formed using the disclosed methods and systems. High boiling hydrocarbons typically have a nominal boiling point greater than 524° C. The high boiling hydrocarbon diluent may optionally contain or be mixed with a medium boiling hydrocarbon, such as startup diesel, vacuum gas oil, atmospheric gas oil, decant oil, cycle oil, or other hydrocarbons having a nominal boiling point in a range of about 200° C. to 524° C.

In some embodiments, the hydrocarbon diluent is comprised entirely of a high boiling material. In alternate embodiments, a portion of the hydrocarbon diluent may comprise a medium boiling material so that the diluent is a mixture of high boiling and medium boiling hydrocarbons. The high boiling hydrocarbon diluent preferably contains at least 25%, at least 50%, at least 70%, at least 80%, at least 90%, or at least 95% by volume of one or more high boiling hydrocarbons and less than 75%, less than 50%, less than 30%, less than 20%, less than 10%, or less than 5% by volume of one or more medium boiling hydrocarbons. In some embodiments, the high boiling hydrocarbon diluent essentially consists of one or more high boiling hydrocarbons and essentially omits one or more medium boiling hydrocarbons.

Consistent with the foregoing, the high boiling hydrocarbon diluent contains one or more high boiling hydrocarbons having a boiling point of at least 524° C. and optionally one or more medium boiling hydrocarbons so that the diluent has a nominal boiling point of at least 350° C., preferably a nominal boiling point of at least 400° C., more preferably a nominal boiling point of at least 450° C., and most preferably a nominal boiling point of at least 500° C., such as a nominal boiling point of at least 524° C. It should be noted that the cut point used as the definition of "vacuum residue" or "vacuum tower bottoms" can vary between refineries, with some refineries using a cut point of 524° C., others using a cut point of 540° C., and still others using a cut point of 565° C. When the vacuum residue has a cut point higher than 524° C., it can be advantageous to include a medium boiling hydrocarbon to reduce the viscosity of the high boiling hydrocarbon diluent used to form the catalyst precursor mixture.

Preferred catalyst precursors are oil soluble and have a decomposition temperature above which they will decompose. It is therefore advantageous for the hydrocarbon diluent to have a temperature that is below the decomposition temperature of the catalyst precursor in order to prevent premature decomposition and formation of agglomerated catalyst particles having low activity. Unfortunately, available high boiling hydrocarbons are typically maintained at relatively high temperatures of up to 300° C., in large part to reduce the viscosity of the high boiling material so that it can be readily pumped and processed.

The temperatures at which high boiling hydrocarbons are typically maintained are generally too high for use of these materials as a diluent for the catalyst precursor. If high boiling hydrocarbons are mixed directly with the catalyst precursor at their normal storage temperature(s), they will cause premature decomposition of the precursor and induce agglomeration of the dispersed catalyst in the catalyst precursor mixture, which will greatly reduce performance of the dispersed catalyst when used to hydroprocess the heavy oil feedstock.

To address this issue, the disclosed methods and systems utilize a cooler (e.g., heat exchanger), which controls the temperature of the high boiling hydrocarbon diluent. Selection and control of this temperature is critical, as it must be high enough to allow the high boiling hydrocarbon to be of sufficiently low viscosity to be flowable and mixable with the catalyst precursor, but low enough to avoid premature decomposition and undesirable agglomeration of dispersed catalyst particles. In some embodiments, the high boiling hydrocarbon diluent is preferably cooled to a temperature in a range of about 75° C. to about 150° C., more preferably in a range of about 75° C. to about 125° C., and most preferably in a range of about 75° C. to about 95° C.

The process of cooling the high boiling hydrocarbon diluent may include adding one or more medium boiling hydrocarbons to the high boil material. Medium boiling hydrocarbons are often stored or maintained at a temperature of less than 150° C., preferably less than 125° C., and more preferably less than 95° C. Thus, the cooling process may include the step of cooling the high boiling hydrocarbon diluent using a cooler, with some of the cooling resulting from mixing in an already cooler medium boiling hydrocarbon.

The high boiling hydrocarbon diluent can be used in amounts ranging from 0.1% to 10%, or from 0.5% to 5%, by volume of the total feedstock going to the hydroprocessing unit. The sources of high-boiling diluent (e.g., heavy oil feedstocks, conditioned heavy oil feedstock, vacuum residue, deasphalted heavy oil, and vacuum tower bottoms) may be used individually at 0.1% to 10%, or from 0.5% to 5%, of the total heavy oil feedstock, or they may be used in any combination that totals 0.1% to 10%, or from 0.5% to 5%, of the total heavy oil feedstock. Such high boiling hydrocarbon diluent sources may optionally be combined with one or more medium boiling hydrocarbons individually, or with one or more heavy boiling diluent sources in any combination that totals 0.1% to 10%, or from 0.5% to 5%, of the total heavy oil feedstock.

An example method for mixing a catalyst precursor into a heavy oil feedstock comprises:
(1) providing a catalyst precursor having a decomposition temperature;
(2) providing a high boiling hydrocarbon diluent comprised of one or more high boiling hydrocarbons and optionally one or more medium boiling hydrocarbons, the high boiling hydrocarbon diluent initially having a temperature above the decomposition temperature of the catalyst precursor;
(3) cooling the high boiling hydrocarbon diluent to a temperature below the decomposition temperature of the catalyst precursor;
(4) mixing the catalyst precursor with the high boiling hydrocarbon diluent to form a diluted precursor mixture; and
(5) mixing the diluted precursor mixture with the heavy oil feedstock to form a conditioned feedstock;

An example system for mixing a catalyst precursor into a heavy oil feedstock comprises:
(1) a catalyst precursor supply line that provides a catalyst precursor at a temperature below the decomposition temperature of catalyst precursor;
(2) at least one diluent supply line that provides a high boiling hydrocarbon diluent comprised of one or more high boiling hydrocarbons and optionally one or more medium boiling hydrocarbons, the diluent supply line providing the high boiling hydrocarbon diluent at an initial temperature above the decomposition temperature of the catalyst precursor;
(3) at least one cooler configured to cool the high boiling hydrocarbon diluent to a temperature below the decomposition temperature of the catalyst precursor;
(4) at least one pre-mixer configured to receive and blend the catalyst precursor with the high boiling hydrocarbon diluent to form a diluted precursor mixture; and
(5) at least one mixer configured to mix the diluted precursor mixture with the heavy oil feedstock to form a conditioned feedstock.

In some embodiments, cooling of the high boiling hydrocarbon diluent is performed exclusively by one or more coolers, such as one or more heat exchangers. In other embodiments, cooling of the high boiling hydrocarbon diluent includes adding a medium boiling hydrocarbon that already has a temperature below the decomposition temperature of the catalyst precursor.

The methods and systems may include a plurality of different mixers and/or different types of mixers, such as static in-line mixers, high shear mixers, surge tank(s) with pump around, and pumps used to feed the heavy oil feedstock to the hydroprocessing reactor.

In some embodiments, a portion of the heavy oil feedstock can be used as a diluent to form the diluted precursor mixture. The heavy oil feedstock, when used as a diluent, is advantageously passed through a heat exchanger to reduce its temperature prior to being mixed with the catalyst precursor.

In other embodiments, a portion of the conditioned feedstock can be used as a diluent to form the diluted precursor mixture. The conditioned feedstock, when used as diluent, is advantageously passed through a heat exchanger to reduce its temperature before being mixed with the catalyst precursor.

In yet other embodiments, a vacuum tower bottoms product can be used as a diluent to form the diluted precursor mixture. The vacuum tower bottoms product, when used as diluent, is advantageously passed through a heat exchanger to reduce its temperature before being mixed with the catalyst precursor.

In still other embodiments, a deasphalted heavy oil can be used as a diluent to form the diluted precursor mixture. The deasphalted heavy oil, when used as diluent, is advantageously passed through a heat exchanger to reduce its temperature before being mixed with the catalyst precursor.

The catalyst precursor is preferably oil-soluble and has a decomposition temperature in a range from about 100° C. (212° F.) to about 350° C. (662° F.), or in a range of about 150° C. (302° F.) to about 300° C. (572° F.), or in a range of about 175° C. (347° F.) to about 250° C. (482° F.). Example catalyst precursors include organometallic complexes or compounds, more specifically oil soluble compounds or complexes of transition metals and organic acids, having a decomposition temperature or range high enough to avoid substantial decomposition when mixed with a heavy oil feedstock under suitable mixing conditions. When mixing the catalyst precursor with a hydrocarbon oil diluent, it is advantageous to maintain the diluent at a temperature below which significant decomposition of the catalyst precursor occurs. One skilled in the art can select a mixing temperature profile that results in intimate mixing of a selected precursor composition without substantial decomposition prior to formation of the dispersed metal sulfide catalyst particles in situ The conditioned feedstock can be passed through a heater to decompose at least a portion of the catalyst precursor and form dispersed metal sulfide catalyst particles in situ within the heavy oil feedstock prior to entering the hydroprocessing reactor. For example, the conditioned feedstock can be removed from the surge tank (e.g., warm surge tank) and passed through a heater. Alternatively, or in addition, at least a portion of the conditioned feedstock can be heated within the hydroprocessing reactor itself to decompose at least a portion of the catalyst precursor and form dispersed metal sulfide catalyst particles in situ within the heavy oil feedstock. It has been found that preheating the conditioned feedstock upstream from the hydroprocessing reactor yields a more active dispersed catalyst.

In some embodiments, the dispersed metal sulfide catalyst particles are less than 1 µm in size, or less than about 500 nm in size, or less than about 250 nm in size, or less than about 100 nm in size, or less than about 50 nm in size, or less than about 25 nm in size, or less than about 10 nm in size, or less than about 5 nm in size.

In some embodiments, the heavy oil feedstock with the in situ formed dispersed metal sulfide catalyst can be hydroprocessed at hydroprocessing conditions, wherein the dispersed metal sulfide catalyst promotes beneficial hydrogenation and other upgrading reactions in the presence of heat and hydrogen. Hydroprocessing can be performed by one or more hydroprocessing reactors selected from slurry phase reactors, ebullated bed reactors, and fixed bed reactors.

For example, hydroprocessing of the heavy oil can be performed using one or more ebullated bed reactors that utilize the dispersed metal sulfide catalyst in combination with a heterogenous ebullated bed catalyst to produce the upgraded heavy oil. Instead of or in addition to the one or more ebullated bed reactors, hydroprocessing of the heavy oil can be performed using one or more slurry phase reactors that utilize the dispersed metal sulfide catalyst as the sole catalyst or in combination with a conventional slurry catalyst, and/or one or more fixed bed reactors that utilize the dispersed metal sulfide catalyst in combination with a heterogenous fixed bed catalyst.

Following hydroprocessing of the heavy oil, the upgraded heavy oil can be separated into one or more lower boiling hydrocarbon fractions and one or more liquid hydrocarbon fractions. For example, the upgraded heavy oil can be separated using one or more hot separation units, an interstage separator that induces a pressure drop, an atmospheric distillation tower, or a vacuum distillation tower.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

I. Introduction

Figure 1:
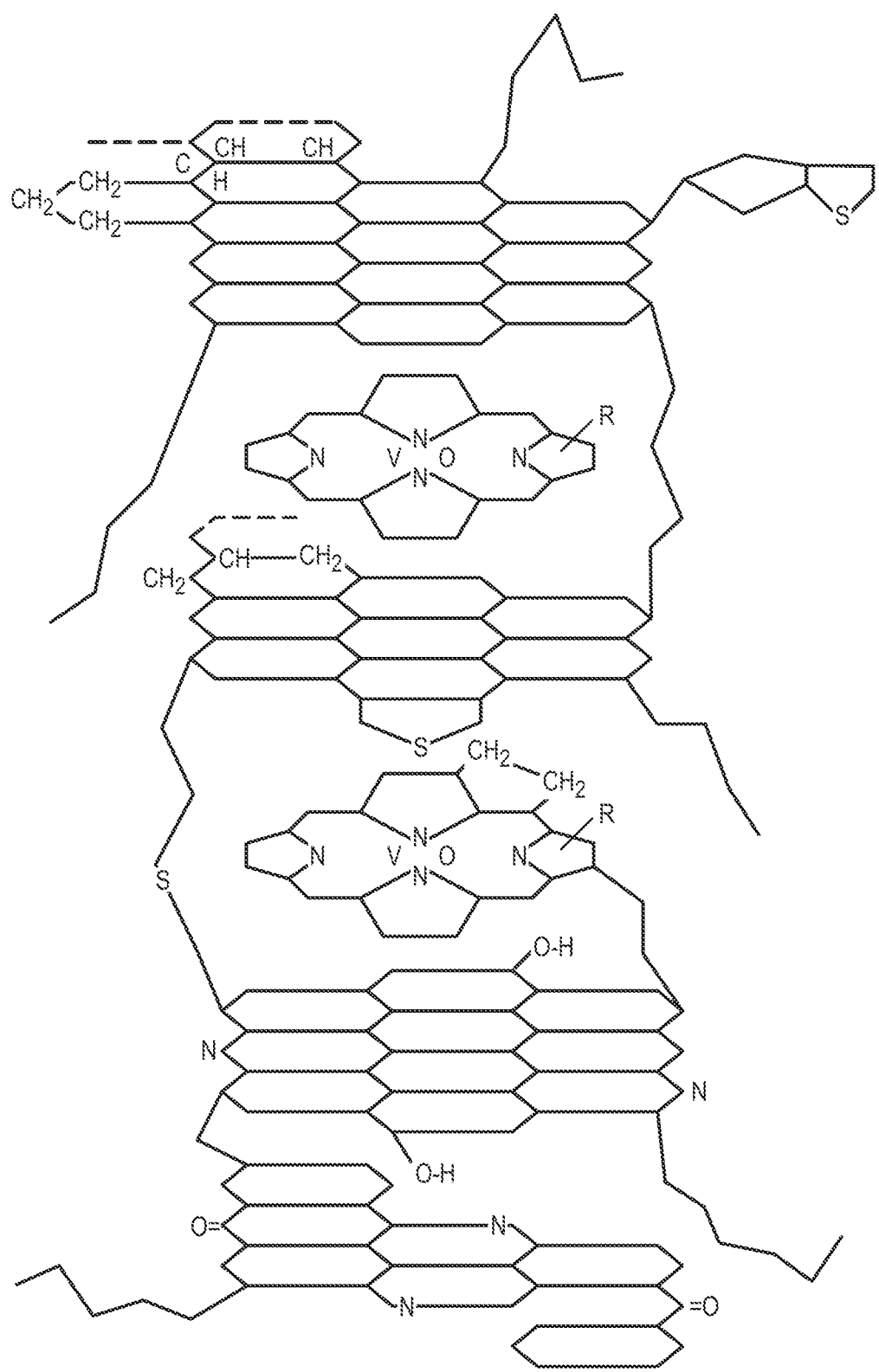
FIG. 1 depicts a hypothetical molecular structure of asphaltene.

Disclosed herein are methods and systems which are specially configured to mix a catalyst precursor into a high boiling hydrocarbon diluent to form a catalyst precursor mixture, which is then mixed with a heavy oil feedstock to form a conditioned feedstock preparatory to hydroprocessing the heavy oil using one or more hydroprocessing reactors. The disclosed methods and systems provide for efficient use of a dispersed catalyst in an ebullated bed, fixed bed, or slurry hydroconversion system when a medium-boiling material is unavailable or disadvantageous as diluent for preparation of the diluted precursor mixture.

The high boiling hydrocarbon diluent can comprise one or more high boiling hydrocarbons, such as vacuum residue, vacuum tower bottoms, other heavy oil feedstocks, deasphalted heavy oil, and/or a side stream of the conditioned heavy oil feedstock formed using the disclosed methods and systems. High boiling hydrocarbons typically have a nominal boiling point greater than 524° C. The high boiling hydrocarbon diluent may optionally contain or be mixed with a medium boiling hydrocarbon, such as startup diesel, vacuum gas oil, atmospheric gas oil, decant oil, cycle oil, or other hydrocarbons having a nominal boiling point in a range of about 200° C. to 524° C.

Preferred catalyst precursors are oil soluble and have a decomposition temperature above which they will decompose. Unfortunately, high boiling hydrocarbons are typically maintained at temperatures above the decomposition temperature of the preferred catalyst to reduce their viscosity so that they can be readily pumped and processed.

The disclosed methods and systems utilize a cooler, which controls the temperature of the high boiling hydrocarbon diluent to prevent significant decomposition of the catalyst precursor when forming the catalyst precursory mixture. In some embodiments, the high boiling hydrocarbon diluent is cooled to a temperature in a range of about 75° C. to about 150° C., or about 75° C. to about 125° C., or about 75° C. to about 95° C.

In some embodiments, cooling of the high boiling hydrocarbon diluent is performed exclusively by one or more coolers, such as one or more heat exchangers. In other embodiments, cooling of the high boiling hydrocarbon diluent includes adding a medium boiling hydrocarbon that already has a temperature below the decomposition temperature of the catalyst precursor.

In some embodiments, a portion of the heavy oil feedstock can be used as a diluent to form the diluted precursor mixture. In other embodiments, a portion of the conditioned feedstock can be used as a diluent to form the diluted precursor mixture. In yet other embodiments, a vacuum tower bottoms product can be used as a diluent to form the diluted precursor mixture. In still other embodiments, a deasphalted heavy oil can be used as a diluent to form the diluted precursor mixture. When used as diluent, such materials are advantageously passed through a heat exchanger to reduce their temperature before being mixed with the catalyst precursor.

II. Definitions

"Asphaltene" and "asphaltenes" refer to materials in heavy oil that are insoluble in paraffinic solvents, such as propane, butane, pentane, hexane, and heptane. Asphaltenes can include sheets of condensed ring compounds held together by heteroatoms, such as sulfur, nitrogen, oxygen, and metals. Asphaltenes broadly include a wide range of complex compounds having from 80 to 1200 carbon atoms, with predominating molecular weights, as determined by solution techniques, in the 1200 to 16,900 range. About 80-90% of the metals in the crude oil are contained in the asphaltene fraction which, together with a higher concentration of non-metallic heteroatoms, render asphaltene molecules more hydrophilic and less hydrophobic than other hydrocarbons in heavy oil resids.

A hypothetical asphaltene molecule structure developed by A. G. Bridge and co-workers at Chevron is depicted in FIG. 1. Asphaltenes are typically defined based on the results of insolubles analyses, and more than one definition of asphaltenes may be used. Specifically, a commonly used definition of asphaltenes is heptane insolubles minus toluene insolubles (i.e., asphaltenes are soluble in toluene; sediments and residues insoluble in toluene are not counted as asphaltenes). Asphaltenes defined in this fashion may be referred to as "$C_7$ asphaltenes". Another definition is measured as pentane insolubles minus toluene insolubles, and commonly referred to as "$C_5$ asphaltenes". In the examples of the present invention, the $C_7$ asphaltene definition is used, but the $C_5$ asphaltene definition can be readily substituted.

"Fouling" refers to the formation of an undesirable phase (foulant) that interferes with processing. The foulant is normally a carbonaceous material or solid (e.g., sediment) that deposits and collects within the processing equipment. Equipment fouling can result in loss of production due to equipment shutdown, decreased performance of equipment, increased energy consumption due to the insulating effect of foulant deposits in heat exchangers or heaters, increased maintenance costs for equipment cleaning, reduced efficiency of fractionators, and reduced reactivity of the heterogeneous catalyst. Hydroprocessing equipment, such as mixing lines, require periodic maintenance to remove sediment and other foulants.

"Rate of equipment fouling" of a hydrocracking reactor can be determined by at least one of: (i) frequency of required heat exchanger clean-outs; (ii) frequency of switching to spare heat exchangers; (iii) frequency of filter changes; (iv) frequency of strainer clean-outs or changes; (v) rate of decrease in equipment skin temperatures, including in equipment selected from heat exchangers, separators, or distillation towers; (vi) rate of increase in furnace tube metal temperatures; (vii) rate of increase in calculated fouling resistance factors for heat exchangers and furnaces; (viii) rate of increase in differential pressure of heat exchangers; (ix) frequency of cleaning atmospheric and/or vacuum distillation towers; or (x) frequency of maintenance turnarounds.

"Heavy oil" and "heavy oil feedstock" refer to heavy crude, oil sands bitumen, bottom of the barrel and residuum left over from refinery processes, such as visbreaker bottoms, and any other lower quality materials that contain a substantial quantity of high boiling hydrocarbon fractions and/or that include a significant quantity of asphaltenes that can deactivate a heterogeneous catalyst and/or cause or result in formation of coke precursors and sediment. Examples of heavy oils include, but are not limited to, Lloydminster heavy oil, Cold Lake bitumen, Athabasca bitumen, atmospheric tower bottoms, vacuum tower bottoms, residuum (or "resid"), resid pitch, vacuum residue (e.g., Ural VR, Arab Medium VR, Athabasca VR, Cold Lake VR, Maya VR, and Chichimene VR), pyrolysis oils, deasphalted liquids obtained by solvent deasphalting, asphaltene liquids obtained as a byproduct of deasphalting, and nonvolatile liquid fractions that remain after subjecting crude oil, bitumen from tar sands, liquefied coal, oil shale, or coal tar feedstocks to distillation, hot separation, solvent extraction, and the like. By way of further example, atmospheric tower bottoms (ATB) can have a nominal boiling point of at least 343° C. although it is understood that the cut point can vary among refineries and be as high as 380° C. Vacuum tower bottoms can have a nominal boiling point of at least 524° C., although it is understood that the cut point can vary among refineries and be as high as 538° C. or even 565° C.

"High boiling hydrocarbon material" and "high boiling hydrocarbon" refer to hydrocarbons at a processing facility that have a nominal boiling point of at least about 524° C. Examples include, but are not limited to, vacuum residues (produced from crude oil after a series of separation processes, including vacuum distillation), vacuum tower bottoms (produced downstream from one or more hydroprocessing reactors after a series of separation processes, including vacuum distillation), other heavy oil feedstocks, deasphalted heavy oil, and/or a conditioned heavy oil feedstock that includes a catalyst precursor and/or dispersed catalyst.

"Medium boiling hydrocarbon material" and "medium boiling hydrocarbon" refer to hydrocarbons at a processing facility that have a nominal boiling point in range of about 200° C. to about 524° C. Examples include, but are not limited to, vacuum gas oil (which typically has a boiling range of 360-524° C.), atmospheric gas oil (which typically has a boiling range of 200°–360° C.), decant oil or cycle oil (which typically has a boiling range of 360°–550° C.), or other hydrocarbons having a nominal boiling point in a range of about 200° C. to 524° C.

"High boiling hydrocarbon diluent" refers to one or more high boiling hydrocarbons used as a diluent and mixed with a catalyst precursor to form a diluted precursor mixture. The high boiling hydrocarbon diluent may optionally include one or more medium boiling hydrocarbons in addition to the one or more high boiling hydrocarbons.

"Catalyst precursor" refers to a compound, such as an oil-soluble compound, that contains or provide one or more catalyst metals, such as molybdenum. Example catalyst precursors include organometallic complexes or compounds, more specifically oil soluble compounds or complexes of transition metals and organic acids, having a decomposition temperature or range high enough to avoid substantial decomposition when mixed with a heavy oil feedstock under suitable mixing conditions.

"Diluted precursor mixture" refers to a mixture of hydrocarbon diluent and catalyst precursor, which is used to disperse the catalyst precursor into a heavy oil feedstock.

"Hydrocracking" and "hydroconversion" refer to processes whose primary purpose is to reduce the boiling range of heavy oil and in which a substantial portion of the heavy oil is converted into products with boiling ranges lower than that of the original feed. Hydrocracking or hydroconversion generally involves fragmentation of larger hydrocarbon molecules into smaller molecular fragments having a smaller number of carbon atoms and a higher hydrogen-to-carbon ratio. The mechanism by which hydrocracking occurs typically involves the formation of hydrocarbon free radicals during thermal fragmentation, followed by capping of free radicals with hydrogen. The hydrogen atoms or radicals that react with hydrocarbon free radicals during hydrocracking can be generated at or by active catalyst sites.

"Hydrotreating" refers to processes whose primary purpose is to remove impurities such as sulfur, nitrogen, oxygen, halides, and trace metals from the feedstock and saturate olefins and/or stabilize hydrocarbon free radicals by reacting them with hydrogen rather than allowing them to react with themselves. The primary purpose is not to change the boiling range of the feedstock. Hydrotreating is most often carried out using a fixed bed reactor, although other hydroprocessing reactors can be used, examples of which are an ebullated bed hydrotreater and slurry phase hydrotreater.

"Hydrocracking" and "hydroconversion" may also involve the removal of sulfur and nitrogen from a feedstock as well as olefin saturation and other reactions typically associated with "hydrotreating". The terms "hydroprocessing" and "hydroconversion" shall broadly refer to both "hydrocracking" and "hydrotreating" processes, which define opposite ends of a spectrum, and everything in between along the spectrum.

"Hydrocracking reactor" refers to any vessel in which hydrocracking (i.e., reducing the boiling range) of a feedstock in the presence of hydrogen and a hydrocracking catalyst is the primary purpose. Hydrocracking reactors are characterized as having one or more inlet ports into which heavy oil and hydrogen are introduced, an outlet port from which an upgraded feedstock or material is withdrawn, and sufficient thermal energy that promotes fragmentation of larger hydrocarbon molecules into smaller molecules, causing formation of hydrocarbon free radicals. Examples of hydrocracking reactors include, but are not limited to, slurry phase reactors (i.e., two-phase, gas-liquid system), ebullated bed reactors (i.e., three-phase, gas-liquid-solid system), and fixed bed reactors (i.e., three-phase system that includes a liquid feed trickling downward over or flowing upward through a fixed bed of solid heterogeneous catalyst with hydrogen typically flowing co-currently with, but possibly counter-currently, to the heavy oil).

"Hydrocracking temperature" refers to a minimum temperature required to cause significant hydrocracking of a heavy oil feedstock. In general, hydrocracking temperatures will preferably fall within a range of about 399° C. (750° F.) to about 460° C. (860° F.), more preferably in a range of about 418° C. (785° F.) to about 443° C. (830° F.), and most preferably in a range of about 421° C. (790° F.) to about 440° C. (825° F.).

"Gas-liquid slurry phase hydrocracking reactor" refers to a hydroprocessing reactor that includes a continuous liquid phase and a gaseous dispersed phase, which forms a "slurry" of gaseous bubbles within the liquid phase. The liquid phase typically comprises a hydrocarbon feedstock that may contain a low concentration of dispersed metal sulfide catalyst particles, which can behave colloidally or as a pseudo solute, and the gaseous phase typically comprises hydrogen gas, hydrogen sulfide, and vaporized low boiling point hydrocarbon products. The liquid phase can optionally include a hydrogen donor solvent.

"Gas-liquid-solid, 3-phase slurry hydrocracking reactor" is used when a solid catalyst is employed along with liquid and gas. The gas may contain hydrogen, hydrogen sulfide, and vaporized low boiling hydrocarbon products. The term "slurry phase reactor" shall broadly refer to both type of reactors (e.g., those with dispersed metal sulfide catalyst particles, those with a micron-sized or larger particulate catalyst, and those that include both).

"Solid heterogeneous catalyst", "heterogeneous catalyst" and "supported catalyst" refer to catalysts typically used in ebullated bed and fixed bed hydroprocessing systems, including catalysts designed primarily for hydrocracking, hydroconversion, hydrodemetallization, and/or hydrotreating. A heterogeneous catalyst typically comprises a catalyst support structure having a large surface area and interconnected channels or pores and fine active catalyst particles, such as sulfides of cobalt, nickel, tungsten, and/or molybdenum, dispersed within the channels or pores. The pores of the support are typically of limited size to maintain mechanical integrity of the heterogeneous catalyst and prevent breakdown and formation of excessive fines in the reactor. Heterogeneous catalysts can be produced as cylindrical pellets, cylindrical extrudates, other shapes such as trilobes, rings, saddles, or the like, or spherical solids.

"Dispersed metal sulfide catalyst particles" and "dispersed catalyst" refer to catalyst particles having a particle size below 1 (submicron, or sub micrometer), preferably less than about 500 nm, or less than about 250 nm, or less than about 100 nm, or less than about 50 nm, or less than about 25 nm, or less than about 10 nm, or less than about 5 nm. The term "dispersed metal sulfide catalyst particles" may include molecular or molecularly-dispersed catalyst compounds. "Dispersed metal sulfide catalyst particles" typically excludes metal sulfide particles and agglomerates of metal sulfide particles that are larger than 1 μm.

"Molecularly-dispersed catalyst" refers to catalyst compounds that are essentially "dissolved" or dissociated from other catalyst compounds or molecules in a hydrocarbon feedstock or suitable diluent. It can include very small catalyst particles that contain a few catalyst molecules joined together (e.g., 15 molecules or less).

"Residual dispersed catalyst particles" and "residual dispersed metal sulfide catalyst particles" refer to catalyst particles that remain with a hydrocarbon product when transferred from one vessel to another (e.g., from a hydroprocessing reactor to a separator and/or other hydroprocessing reactor). Residual dispersed metal sulfide catalyst particles may also remain in a liquid residual fraction or pitch after separation of a hydrocarbon product into distillates and residual liquid or pitch, such as by flash separation, hot separation, atmospheric distillation, vacuum distillation, or vacuum stripping.

"Conditioned feedstock" refers to a hydrocarbon feedstock into which a catalyst precursor has been combined and mixed sufficiently so that, upon decomposition of the catalyst precursor and formation of the active catalyst, the catalyst will comprise dispersed metal sulfide catalyst particles formed in situ within the feedstock. Conditioned feedstocks include conditioned heavy oil.

"Upgrade", "upgrading" and "upgraded", when used to describe a feedstock that is being or has been subjected to hydroprocessing, or a resulting material or product, refer to one or more of a reduction in molecular weight of the feedstock, a reduction in boiling point range of the feedstock, a reduction in concentration of asphaltenes, a reduction in concentration of hydrocarbon free radicals, and/or a reduction in quantity of impurities, such as sulfur, nitrogen, oxygen, halides, and metals.

"Severity" refers to the amount of energy that is introduced into heavy oil during hydroprocessing and is related to the operating temperature of the hydroprocessing reactor (i.e., higher temperature is related to higher severity and lower temperature is related to lower severity at same or similar throughput) in combination with duration or residence time. Increased severity generally increases the quantity of converted products produced by the hydroprocessing reactor, including both desirable products and undesirable products. Conversion and throughput also affect severity. For example, when temperature is increased and throughput is held constant, conversion typically increases for a given feedstock. In order to maintain temperature while increasing throughput (i.e., increasing the liquid hourly space velocity), which decreases residence time of the heavy oil in the reactor, more heat energy must be added to the system to offset the cooling effect of passing a greater quantity per unit time of initially cooler heavy oil into the reactor.

Desirable conversion products include hydrocarbons of reduced molecular weight, boiling point, and specific gravity, which can include end products such as naphtha, diesel, jet fuel, kerosene, wax, fuel oil, and the like. Other desirable conversion products include higher boiling hydrocarbons that can be further processed using conventional refining and/or distillation processes. Bottoms products of sufficient quality to be useful as fuel oil are other examples of desirable conversion products.

Undesirable conversion products include coke, sediment, metals, and other solid materials that can deposit on hydroprocessing equipment and cause fouling, such as interior components of reactors, separators, filters, pipes, towers, heat exchangers, and the heterogeneous catalyst. Low quality conversion products can refer to unconverted resid that remains after distillation, such as atmospheric tower bottoms ("ATB") or vacuum tower bottoms ("VTB"), particularly which are of too low of quality to be useful as fuel oil or other desired use. Minimizing undesirable conversion products reduces equipment fouling and shutdowns required to clean the equipment.

In addition to temperature, "severity" can be related to one or both of "conversion" and "throughput". Whether increased severity involves increased conversion and/or increased or decreased throughput may depend on the quality of the heavy oil feedstock and/or the mass balance of the overall hydroprocessing system. For example, where it is desired to convert a greater quantity of feed material and/or provide a greater quantity of material to downstream equipment, increased severity may primarily involve increased throughput without necessarily increasing fractional conversion. This can include the case where resid fractions (ATB and/or VTB) are sold as fuel oil, and increased conversion without increased throughput might decrease the quantity of this product. In the case where it is desired to increase the ratio of upgraded materials to resid fractions, it may be desirable to primarily increase conversion without necessarily increasing throughput. Where the quality of heavy oil introduced into the hydroprocessing reactor fluctuates, it may be desirable to selectively increase or decrease one or both of conversion and throughput to maintain a desired ratio of upgraded materials to resid fractions and/or a desired absolute quantity or quantities of end product(s) being produced.

"Conversion" and "fractional conversion" refer to the proportion, often expressed as a percentage, of heavy oil that is converted into lower boiling and/or lower molecular weight materials. Conversion is expressed as a percentage of the initial resid content (i.e., components with boiling points greater than a defined residue cut point) that is converted to products with boiling points less than the defined cut point. The definition of residue cut point can vary and can nominally include 524° C. (975° F.), 538° C. (1000° F.), 565° C. (1050° F.), and the like. It can be measured by distillation analysis of feed and product streams to determine the concentration of components with boiling point greater than the defined cut point. Fractional conversion is expressed as (F−P)/F, where F is the quantity of resid in the combined feed streams and P is the quantity in the combined product streams, where both feed and product resid content are based on the same cut point definition. The quantity of resid is most often defined based on the mass of components with boiling point greater than the defined cut point, but volumetric or molar definitions can also be used.

The conversion of asphaltenes can be different than the overall conversion of heavy oil. For purposes of this disclosure, a useful definition of asphaltene conversion is based on the relative amounts of asphaltenes in the fresh feedstock and upgraded product, and can be defined by the following, which results in a decimal fraction between 0 and 1, which can be converted into a percentage by multiplying by 100:

$$\text{Conv}=[\text{Asph(fresh feed)}-\text{Asph(products)}]/\text{Asph(fresh feed)}.$$

The asphaltene content of a recycle stream is internal to the process. When conversion of asphaltenes is too low compared to conversion of heavy oil as a whole, recycle buildup of asphaltenes can occur.

"Throughput" refers to the quantity (mass or volume) of feed material introduced into the hydroprocessing reactor per unit of time. Throughput can be expressed in volumetric terms, such as barrels per hour or per day, or in mass terms, such as metric tons per hour or per day. In common usage, throughput is defined as the mass or volumetric feed rate of only the heavy oil feedstock itself (for example, vacuum tower bottoms or the like). The definition normally excludes the quantity of diluents or other components that can be added to or included in the overall feeds to a hydroconversion unit, although a definition which includes those other components can also be used.

"Space velocity" and "liquid hourly space velocity" are related to the throughput of a particular reactor or reactor size but are normalized to remove the size (volume) of the reactor. Thus, a larger reactor can have twice the throughput but the same space velocity as a reactor with half the volume size. Therefore, an increase in space velocity is typically proportional to an increase in throughput for a given reactor size. Space velocity is inversely proportional to residence time of heavy oil in a reactor of given reactor size.

"Production rate of converted products" is an absolute rate that can be expressed in volumetric terms, such as barrels per hour or per day, or in mass terms, such as metric tons per hour or per day. The "production rate of converted products" should not be confused with yield or efficiency, which are sometimes erroneously called "rate" (e.g., production rate per unit feed rate, or production rate per unit converted feed). It will be appreciated that the actual numeric values of both initial production rate of converted products and increased production rate of converted products are specific to an individual production facility and depend on the capacity of that facility. Therefore, it is valid to compare the production rate of the unit or facility in question before and after modification but not against a different unit or facility built with a different capacity.

III. Example Hydroprocessing Systems

FIGS. 2-4B illustrate example hydroprocessing reactors and systems that can be used with and benefitted by being combined or integrated with the disclosed methods and systems for mixing a catalyst precursor into heavy oil using a high boiling hydrocarbon diluent to form a conditioned heavy oil feedstock. The conditioned feedstock is heated to decompose the catalyst precursor to form dispersed metal sulfide catalyst particles in situ within the heavy oil feedstock. Heating can be performed upstream from and/or within the hydroprocessing reactor.

The disclosed methods and systems can be employed or positioned anywhere within the illustrated hydroprocessing systems. In general, the methods and systems are utilized or positioned upstream from a hydroprocessing reactor configured to operate using the dispersed metal sulfide catalyst, which is generated in situ within heavy oil. The disclosed methods and systems provide for continuous introduction of catalyst precursor into heavy oil and the formation of dispersed metal sulfide catalyst particles in situ within the heavy oil, while being able to utilize high boiling hydrocarbon materials as a diluent without prematurely decomposing the catalyst precursor.

Feedstocks that can be used in the disclosed mixing methods and systems and hydroprocessed using one or more hydroprocessing reactors may comprise any desired fossil fuel feedstock and/or fraction thereof, including, but not limited to, one or more of heavy crude, oil sands bitumen, bottom of the barrel fractions from crude oil, atmospheric tower bottoms, vacuum tower bottoms, coal tar, liquefied coal, other resid fractions, pyrolysis oil, and deasphalted oil. Heavy oils and resids can include a significant fraction of high boiling point hydrocarbons (i.e., nominally at or above 343° C. (650° F.), more particularly nominally at or above about 524° C. (975° F.)) and/or asphaltenes. As mentioned above and illustrated in FIG. 1, asphaltenes are complex hydrocarbon molecules that include a relatively low ratio of hydrogen to carbon and a substantial number of condensed aromatic and naphthenic rings with paraffinic side chains. Sheets consisting of condensed aromatic and naphthenic rings are held together by heteroatoms, such as sulfur or nitrogen, polymethylene bridges, thioether bonds, and/or vanadium and nickel complexes. Asphaltenes also have more sulfur and nitrogen than crude oil or the rest of a vacuum resid, and they also contain higher concentrations of carbon-forming compounds (i.e., that form coke precursors and sediment).

Figure 2:
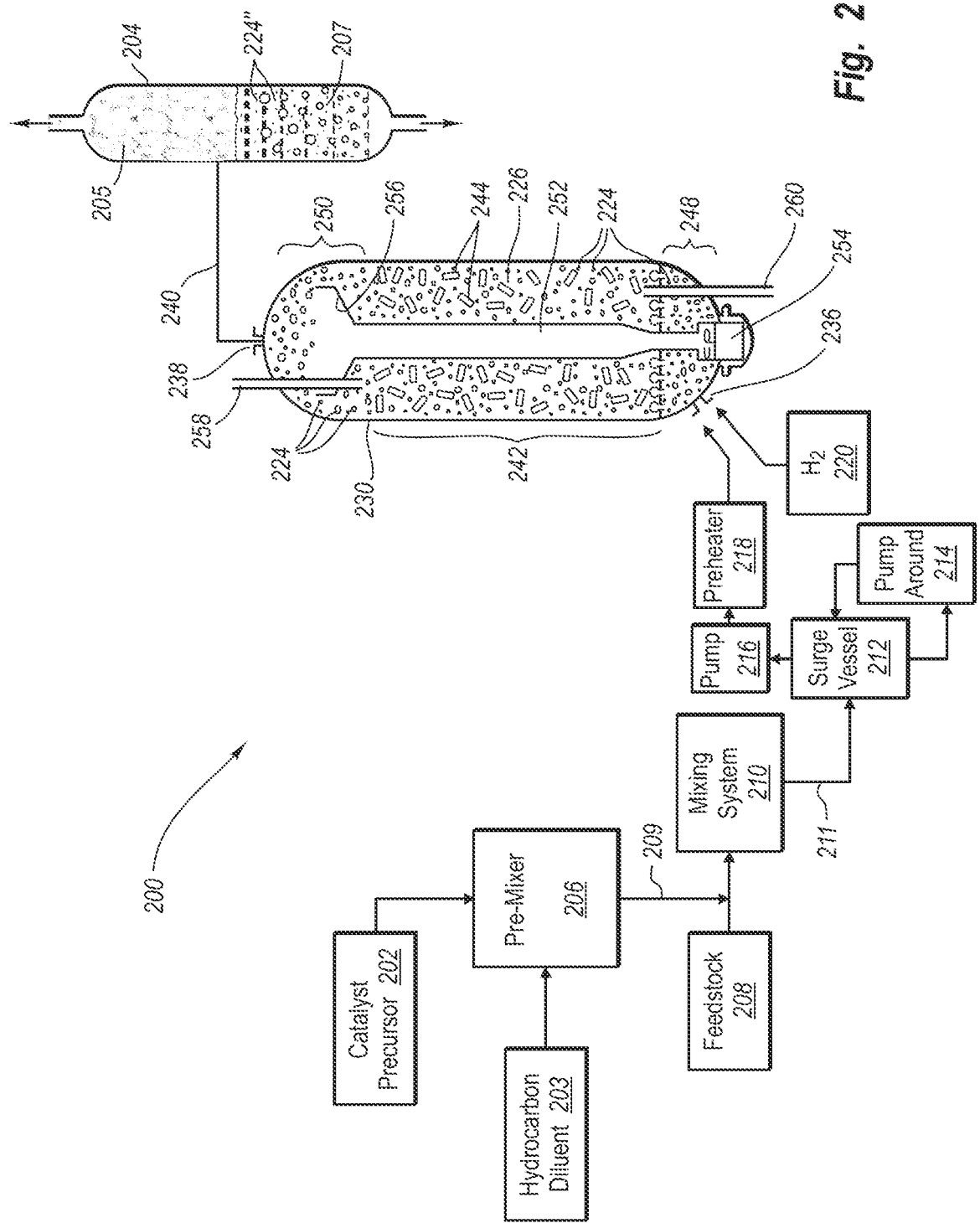
FIG. 2 schematically illustrates an exemplary ebullated bed hydroprocessing system using a dual catalyst system that can be used to hydroprocess heavy oil.

FIG. 2 schematically illustrates an example ebullated bed hydroprocessing system 200 that utilizes a dual catalyst system of dispersed metal sulfide catalyst particles and a heterogenous ebullated bed catalyst. The ebullated bed hydroprocessing system 200 includes an ebullated bed reactor 230 and a separator 204 (such as a hot separator, inter-stage pressure differential separator, or distillation tower). The ebullated bed reactor 230 is similar to that used in the LC-Fining hydrocracking system developed by C-E Lummus. A catalyst precursor 202 is blended with a hydrocarbon diluent 203 in one or more pre-mixers 206 to form a diluted precursor mixture 209. The diluted precursor mixture 209 is added to and blended with a heavy oil feedstock 208 using a mixing system 210 to form a conditioned feedstock 211.

The conditioned feedstock 211 is fed into a surge tank 212 with a pump around loop 214 to effect further mixing and dispersion of the catalyst precursor 202 within the feedstock 208. A bypass line (not shown) returns any heavy oil that bypasses the mixing lines (not shown) to a common discharge line (not shown) and/or feeds the heavy oil directly into the surge tank 212. The surge tank 212 and pump around loop 214 advantageously effect further mixing of the catalyst precursor into the heavy oil, including heavy oil from the bypass line. The conditioned feedstock from the surge tank 212 is pressurized by one or more pumps 216, passed through a pre-heater 218, and fed into the ebullated bed hydroprocessing reactor 230 together with hydrogen gas 220 through one or more inlet ports 236 located at or near the bottom of the ebullated bed reactor 230.

The ebullated bed reactor 230 includes a hydrocarbon material 226 and an expanded catalyst zone 242 comprising a heterogeneous catalyst 244 typical for ebullated bed reactors, which is maintained in an expanded or fluidized state against the force of gravity by upward movement of liquid hydrocarbons 226 and gas. A lower heterogeneous catalyst free zone 248 is located below a distributor grid plate defining the bottom of the expanded catalyst zone 242, and an upper heterogeneous catalyst free zone 250 is located above the expanded catalyst zone 242. Dispersed metal sulfide catalyst particles 224 are dispersed throughout the hydrocarbon material 226 within the ebullated bed reactor 230, including in the expanded catalyst zone 242 and the heterogeneous catalyst free zones 248, 250, thereby being available to promote beneficial upgrading reactions in the absence of the heterogeneous catalyst 244.

A funnel-shaped recycle cup 256 that feeds into a recycling channel 252 connected to an ebullating pump 254 continuously recirculate the hydrocarbon material 226 from the upper heterogeneous catalyst free zone 250 to the lower heterogeneous catalyst free zone 248. Downward suction by the recycle cup 256 at the top of the recycling channel 252 draws the hydrocarbon material 226 containing the dispersed catalyst particles 224 from the upper heterogeneous catalyst free zone 250 down through the recycling channel 252 and into the bottom of the ebullated bed reactor 230 by the ebullating pump 254. The recycled hydrocarbon material 226 is blended with new feedstock containing dispersed metal sulfide catalyst particles (and/or catalyst precursor) and hydrogen gas 220.

Fresh heterogeneous catalyst 244 can be introduced periodically into the ebullated bed reactor 230 through a catalyst inlet tube 258 and spent heterogeneous catalyst 244 can be withdrawn periodically through a catalyst withdrawal tube 260. The dispersed metal sulfide catalyst particles 224 provide additional catalytic activity within expanded catalyst zone 242, recycle channel 252, and lower and upper heterogeneous catalyst free zones 248, 250. The catalytic addition of hydrogen to hydrocarbons outside of the heterogeneous catalyst 244 reduces or minimizes formation of sediment and coke precursors, which are often responsible for deactivating the heterogeneous catalyst and causing system fouling.

The ebullated bed reactor 230 further includes an outlet port 238 at or near the top through which converted materials 240 are withdrawn. The converted materials 240 are introduced into a separator 204, which separates a volatile fraction 205 from a resid fraction 207. The volatile fraction 205 is withdrawn from the top of the hot separator 204, and the resid fraction 207 is withdrawn from a bottom of the hot separator 204. The resid fraction 207 contains residual dispersed metal sulfide catalyst particles, schematically depicted as catalyst particles 224". If desired, at least a portion of the resid fraction 207 can be recycled back to the ebullated bed reactor 230 to form part of the feed material and provide supplemental dispersed metal sulfide catalyst particles. Alternatively, the resid fraction 207 can be further processed using downstream processing equipment, such as another ebullated bed reactor, a distillation tower, a deasphalting unit, and the like. A portion of the resid fraction 207 can be used as part or all of the hydrocarbon oil diluent 203 added to the pre-mixer 206 to form the diluted catalyst precursor 209.

Figure 3A:
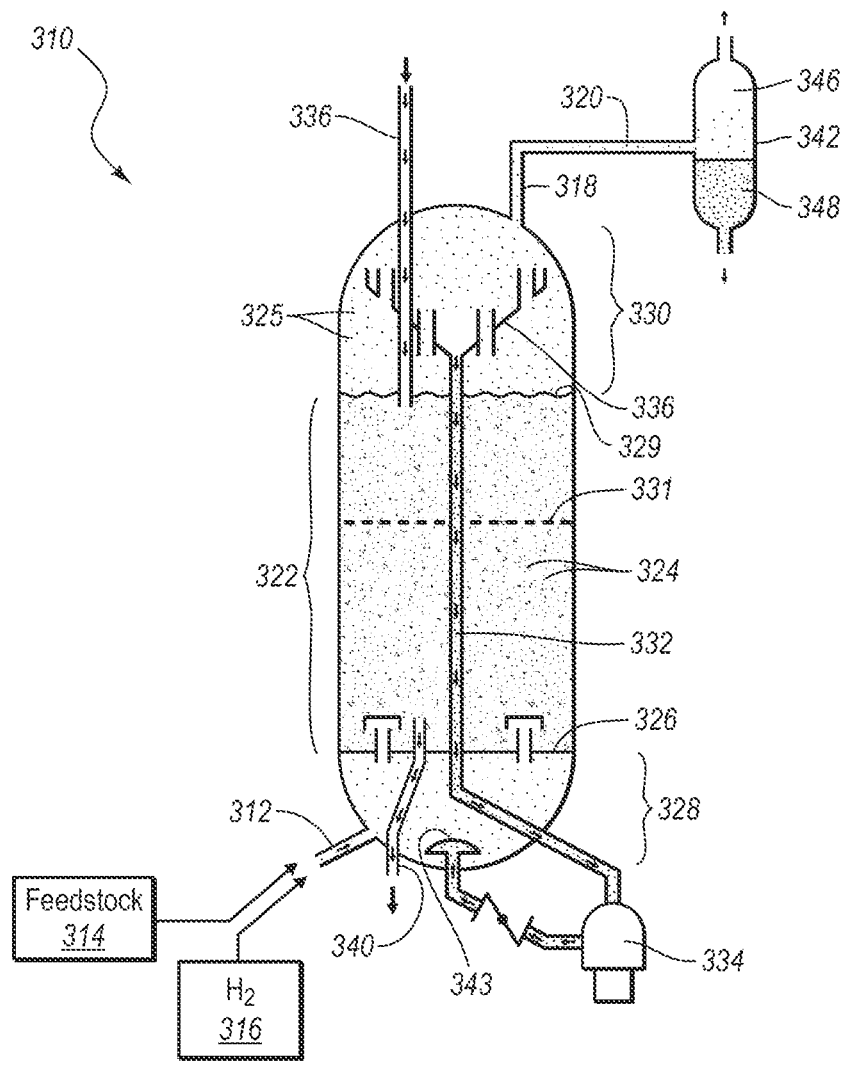
FIG. 3A schematically illustrates an exemplary ebullated bed reactor and a separator unit that separates volatilizable materials from non-volatilizable materials.

FIG. 3A schematically illustrates another type of ebullated bed hydroprocessing reactor 310 having a different recirculating system typical of the H-Oil hydrocracking system developed by Hydrocarbon Research, Inc. and currently licensed by Axens. The ebullated bed reactor 310 includes an inlet port 312 through which a heavy oil feedstock 314 and pressurized hydrogen gas 316 are introduced, and an outlet port 318 through which upgraded hydrocarbon material 320 is withdrawn.

An expanded catalyst zone 322 comprising a heterogeneous catalyst 324 is bounded by a distributor grid plate 326, which separates the expanded catalyst zone 322 from a lower catalyst free zone 328 below the distributor grid plate 326, and an upper end 329, which defines an approximate boundary between the expanded catalyst zone 322 and an upper catalyst free zone 330. A dotted boundary line 331 schematically illustrates the approximate level of the heterogeneous catalyst 324 when not in an expanded or fluidized state. Dispersed metal sulfide catalyst particles 325 are dispersed throughout the hydrocarbon material in the ebullated bed reactor 310, both in the expanded catalyst zone 322 and in lower and upper heterogeneous catalyst free zones 228, 230.

Hydrocarbons and other materials in the ebullated bed reactor 310 are continuously recirculated by a recycling channel 332 connected to an ebullating pump 334 positioned outside of the reactor 310. Materials are drawn through a funnel-shaped recycle cup 336 from the upper heterogeneous catalyst free zone 330. The recycle cup 336 helps separate hydrogen bubbles from recycled material passing down through recycle channel 332 to prevent cavitation in the ebullating pump 334. The recycled material enters the lower heterogeneous catalyst free zone 328 through a discharge bell cap 343, where it is blended with fresh heavy oil feedstock 314 and hydrogen gas 316. This mixture passes up through the distributor grid plate 326 and into the expanded catalyst zone 322. Fresh heterogeneous catalyst can be introduced periodically into the expanded catalyst zone 322 through a catalyst inlet tube 336 and spent heterogeneous catalyst can be periodically withdrawn through a catalyst discharge tube 340.

The main difference between the H-Oil ebullated bed reactor 310 illustrated in FIG. 3A and the LC-Fining ebullated bed reactor 200 illustrated in FIG. 2 is the location of the ebullating pump. The ebullating pump 334 in the H-Oil reactor 310 is located external to the reaction chamber. The recirculated material is introduced through a recirculation port with distributor cap 343 at the bottom of the ebullated bed reactor 310. The distributor cap 343 aids in evenly distributing materials through the lower catalyst free zone 328.

Upgraded material 320 is withdrawn from the outlet port 318 of the ebullated bed reactor 310 and introduced into a separator 342 (e.g., hot separator, inter-stage pressure differential separator, atmospheric distillation tower, or vacuum distillation tower). The separator 342 is configured to separate a volatile fraction (gas and distillates) 346 from a non-volatile fraction (or liquid) 348. Distillates and gases 346 are removed at one location (e.g., top) of the separator 342, and a non-volatilized fraction 348 containing liquid hydrocarbons and residual dispersed metal sulfide catalyst particles are removed from another location (e.g., bottom) of the separator 342.

Figure 3B:
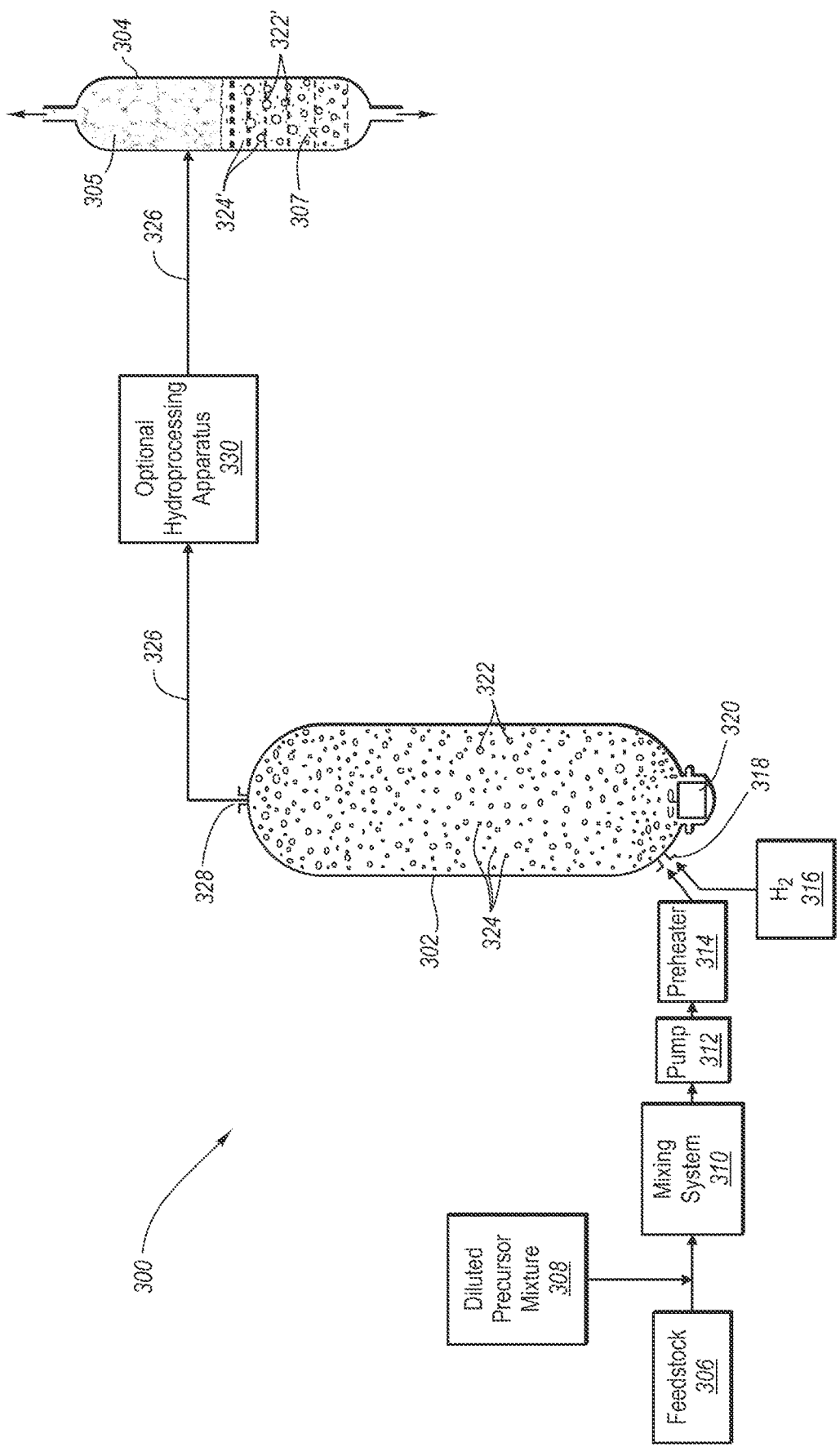
FIG. 3B schematically illustrates an exemplary slurry phase reactor and a separator unit that separates volatilizable materials from non-volatilizable materials.

FIG. 3B schematically depicts a hydroprocessing system 300 that includes a slurry phase reactor 302 and a separator 304 (e.g., hot separator, interstage pressure-differential separator, or distillation tower). A heavy oil feedstock 306 is blended and conditioned with a catalyst precursor mixture 308 using a mixing system 310. The diluted precursor mixing 308 comprises a catalyst mixed with a diluent formed in a pre-mixer (not shown). The conditioned feedstock from the mixing system 310 is pressurized by a pump 312, which can also serve as a multi-stage mixing device to further disperse the catalyst precursor throughout the heavy feedstock 306, passed through a pre-heater 314, and fed into the slurry phase reactor 302 together with hydrogen gas 316 through one or more input ports 318 located at or near the bottom of the slurry phase reactor 302.

A stirrer 320 at the bottom of the slurry phase reactor 302 induces mixing within the liquid phase, thus helping to more evenly disperse the heat generated by the hydrocracking reactions. Alternatively, or in addition to the stirrer 320, the slurry phase reactor 302 may include a recycle channel, recycling pump, and distributor grid plate (not shown) as in conventional ebullated bed reactors (See FIGS. 2 and 3A) to promote more even dispersion of reactants, catalyst, and heat. Hydrogen is schematically depicted as gas bubbles 322, and dispersed metal sulfide catalyst particles are schematically depicted as catalyst particles 324 in the reactor 302. It will be appreciated that gas bubbles 322 and catalyst particles 324 are shown oversized so that they may be seen in the drawing. In reality, they may be invisible to the naked eye.

The heavy oil feedstock 306 is catalytically upgraded in the presence of the hydrogen 316 and dispersed metal sulfide catalyst 324 within the slurry phase reactor 302 to form an upgraded hydrocarbon product 326. The upgraded product 326 is continuously withdrawn from the slurry phase reactor 302 through an output port 328 located at or near the top of the reactor 302 and then fed into the separator 304 (e.g., hot separator and/or distillation tower), optionally after passing through optional hydroprocessing apparatus 330. The upgraded product 326 fed to the separator 304 contains residual catalyst particles, schematically depicted as particles 324', and residual hydrogen, schematically depicted as bubbles 322', which can continue promoting beneficial upgrading reactions and reduce avoid equipment fouling. The separator 304 separates the volatile fraction 305 from a non-volatile fraction 307. The volatile fraction 305 is withdrawn from the top of hot separator 304, and the non-volatile fraction 307 is withdrawn from the bottom of hot separator 304.

Figure 3C:
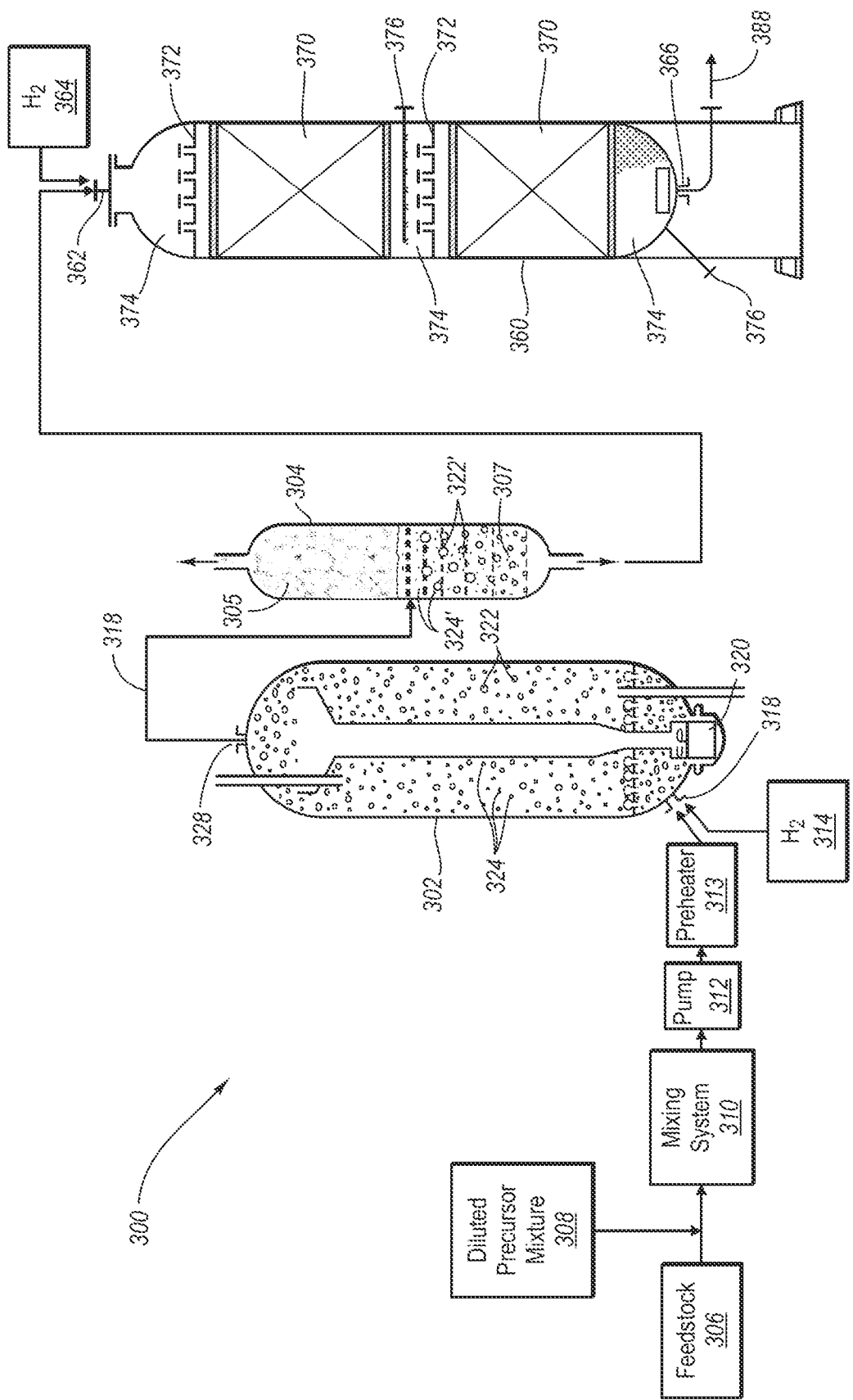
FIG. 3C schematically illustrates an exemplary hydroprocessing system that includes a slurry phase reactor, a separator unit that separates volatilizable materials from non-volatilizable materials, and a fixed bed reactor for further hydroprocessing the non-volatilizable materials.

FIG. 3C schematically depicts a hydroprocessing system 300 that includes a slurry phase reactor 302, a hot separator 304, and a fixed bed reactor 360. The upgraded hydrocarbon material 326 contains residual dispersed metal sulfide catalyst particles, schematically depicted as particles 324' within the hot separator 304. The liquid fraction 307 residual dispersed metal sulfide catalyst particles 324' from the hot separator 304 are introduced into the fixed bed reactor 360 for further hydroprocessing. The fixed bed reactor 360 may be designed to perform hydrocracking and/or hydrotreating reactions depending on the operating temperature and/or the type of solid supported catalyst that is used within the fixed bed reactor 360.

The fixed bed reactor 360 more particularly includes an input port 362 at the top through which the liquid fraction 307 and supplemental hydrogen gas 364 are introduced, and an output port 366 at the bottom through which a further hydroprocessed material 388 is withdrawn. The fixed bed reactor 360 further includes a plurality of vertically stacked and spaced apart catalyst beds 370 comprising a packed porous supported catalyst. Above each catalyst bed 370 is a distributor grid 372, which helps to more evenly distribute the flow of feedstock downward through the catalyst beds 370. Supported catalyst free zones 374 exist above and below each catalyst bed 370. The residual catalyst particles 324' remain dispersed throughout the feedstock within the fixed bed reactor 360, in both catalyst beds 370 and the supported catalyst free zones 374, which further promote beneficial upgrading reactions. Auxiliary ports 376 in the center and/or bottom of the fixed bed reactor 360 may be provided through which a cooling oil and/or hydrogen quench can be introduced to cool heat generated by the hydroprocessing reactions, control the reaction rate, and thereby help prevent formation of coke precursors and sediment and/or excessive gas within the fixed bed reactor 360.

Figure 4A:
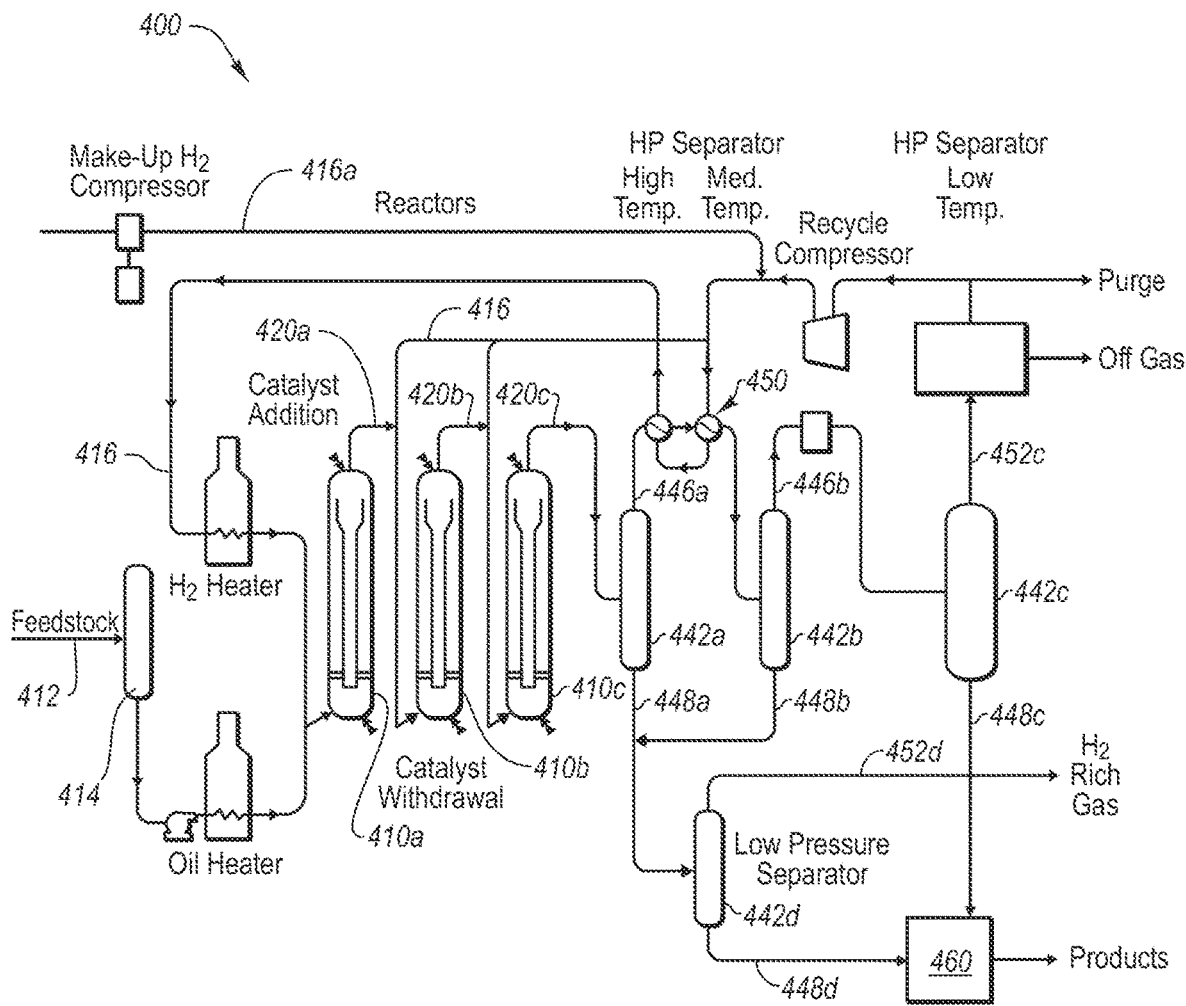
FIG. 4A schematically illustrates an exemplary ebullated bed hydroprocessing system with multiple ebullated bed reactors and other processing equipment.

FIG. 4A schematically illustrates an ebullated bed hydroprocessing system 400 comprising multiple ebullated bed reactors 410. Hydroprocessing system 400, an example of which is an LC-Fining or H-Oil hydroprocessing unit, may include three ebullated bed reactors 410a, 410b, 410c in series for upgrading a feedstock 412. The feedstock 412 from a surge tank 414 is pressurized, pre-heated, and introduced into a first ebullated bed reactor 410a together with hydrogen gas 416, both of which are passed through respective heaters prior to entering the first reactor 410a. Upgraded hydrocarbon material 420a from the first ebullated bed reactor 410a is introduced together with additional hydrogen gas 416 into a second ebullated bed reactor 410b. Upgraded hydrocarbon material 420b from the second ebullated bed reactor 410b is introduced together with additional hydrogen gas 416 into a third ebullated bed reactor 410c.

It should be understood that one or more interstage separators (not shown) can optionally be interposed between first and second ebullated bed reactors 410a, 410b and/or between second and third ebullated bed reactors 410b, 410c, in order to remove lower boiling fractions and gases from a non-volatile fraction containing liquid hydrocarbons and residual dispersed metal sulfide catalyst particles. It can be desirable to remove lower alkanes, such as hexanes and heptanes, which are valuable fuel products but poor solvents for asphaltenes. Removing volatile materials between multiple reactors enhances production of upgraded products and increases the solubility of asphaltenes in the liquid hydrocarbon material fed to downstream reactor(s). Both increase efficiency of the overall hydroprocessing system.

Upgraded hydrocarbon material 420c from the third ebullated bed reactor 410c is sent to a high temperature separator 442a, which separates volatile and non-volatile fractions. A volatile fraction 446a passes through a heat exchanger 450, which removes heat that can be used to preheat hydrogen gas 416 before it is fed into first ebullated bed reactor 410a. The somewhat cooled volatile fraction 446a is sent to a medium temperature separator 442b, which separates a remaining volatile fraction 446b from a resulting liquid fraction 448b that forms as a result of cooling by heat exchanger 450. The remaining volatile fraction 446b is sent downstream to a low temperature separator 442c for further separation into a gaseous fraction 452c and a degassed liquid fraction 448c.

A liquid fraction 448a from high temperature separator 442a is combined with the resulting liquid fraction 448b from the medium temperature separator 442b and the mixture sent to a low pressure separator 442d, which separates a hydrogen rich gas 452d from a degassed liquid fraction 448d, which is sent along with the degassed liquid fraction 448c from the low temperature separator 442c to a backend system 460, which includes one or more distillation towers, including a vacuum distillation tower, where the materials are fractionated into products.

Gaseous fraction 452c from low temperature separator 442c is purified into off-gas, purge gas, and hydrogen gas 416. Hydrogen gas 416 is compressed, mixed with make-up hydrogen gas 416a, and either passed through heat exchanger 450 and introduced into first ebullated bed reactor 410a together with feedstock 412 or introduced directly into second and third ebullated bed reactors 410b, 410c.

Figure 4B:
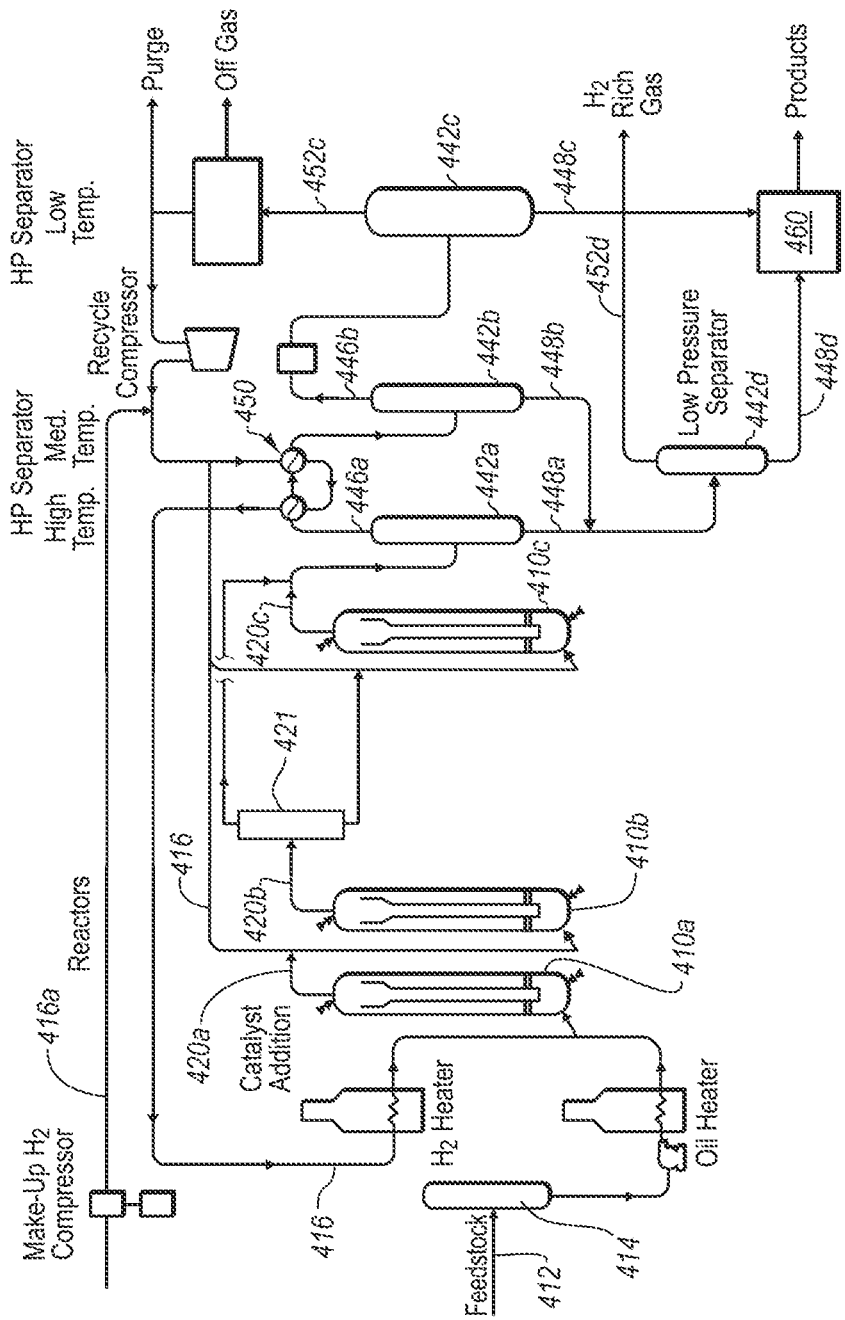
FIG. 4B schematically illustrates an exemplary ebullated bed hydroprocessing system comprising multiple ebullated bed reactors, similar to FIG. 4A, and an interstage separator between two of the reactors.

FIG. 4B schematically illustrates an ebullated bed hydroprocessing system 400 comprising multiple ebullated bed reactors, similar to the system illustrated in FIG. 4A, but showing an interstage separator 421 interposed between the second and third ebullated bed reactors 410b, 410c (although the interstage separator 421 (or other separator) may be interposed between the first and second ebullated bed reactors 410a, 410b). As illustrated, effluent from second stage ebullated bed reactor 410b enters the interstage separator 421, which can be a high-pressure, high-temperature separator. The liquid fraction from the separator 421 is combined with a portion of the recycle hydrogen from line 416 and fed into the third-stage reactor 410c. The vapor fraction from interstage separator 421 bypasses the third-stage reactor 410c, mixes with the effluent from third-stage reactor 410c, and then passes into a high-pressure, high-temperature separator 442a.

This allows lighter, more-saturated components formed in the first two reactor stages 410a, 410b to bypass the third stage reactor 410c. The benefits of this are (1) reduced vapor load on the third-stage reactor 410c, which increases volume utilization of the third-stage reactor for converting the remaining heavy components, and (2) reduced concentration of "anti-solvent" components (saturates) which can destabilize (e.g., precipitate) asphaltenes in the third-stage reactor 410c.

The hydroprocessing systems are typically configured and operated to promote more severe hydrocracking reactions rather than less severe hydroprocessing reactions, such as hydrotreating. Hydrocracking involves the breaking of carbon-carbon molecular bonds, such as reducing the molecular weight of larger hydrocarbon molecules and/or ring opening of aromatic compounds. Hydrotreating, on the other hand, mainly involves hydrogenation of unsaturated hydrocarbons, with minimal or no breaking of carbon-carbon molecular bonds.

To promote more severe hydrocracking reactions rather than less severe hydrotreating reactions, the hydroprocessing reactor(s) is/are preferably operated at a temperature in a range of about 750° F. (399° C.) to about 860° F. (460° C.), more preferably in a range of about 780° F. (416° C.) to about 830° F. (443° C.), are preferably operated at a pressure in a range of about 1000 psig (6.9 MPa) to about 3000 psig (20.7 MPa), more preferably in a range of about 1500 psig (10.3 MPa) to about 2500 psig (17.2 MPa), and are preferably operated at a liquid hourly space velocity (LHSV) of about 0.05 hr$^{-1}$ to about 0.45 hr$^{-1}$, more preferably about 0.1 hr$^{-1}$ to about 0.35 hr$^{-1}$. The difference between hydrocracking and hydrotreating can be expressed in terms of resid conversion (whereas hydrocracking results in the substantial conversion of higher boiling to lower boiling hydrocarbons, hydrotreating does not).

The hydroprocessing systems disclosed herein can result in an overall resid conversion in a range of about 60% to about 95%, preferably in a range of about 75% to about 90%. The preferred conversion range typically depends on the type of feedstock because of differences in processing difficulty between different feedstocks.

Operating an ebullated bed reactor using a dual catalyst system can result in the same or reduced equipment fouling compared to operating the ebullated bed reactor with only a heterogeneous catalyst. For example, the rate of equipment fouling when using a dual catalyst system rather than a heterogeneous catalyst by itself can result in one or more of the following benefits: (i) reduced frequency of heat exchanger shutdowns and/or distillation tower shutdowns for cleanout; (ii) reduced frequency of changes or cleaning of filters and strainers; (iii) reduced frequency of switches to spare heat exchangers; (iv) reduced rate of decreasing skin temperatures in equipment such as heat exchangers, separators, or distillation towers; (v) reduced rate of increasing furnace tube metal temperatures; and (vi) reduced rate of increasing calculated fouling resistance factors for heat exchangers.

Figure 5:
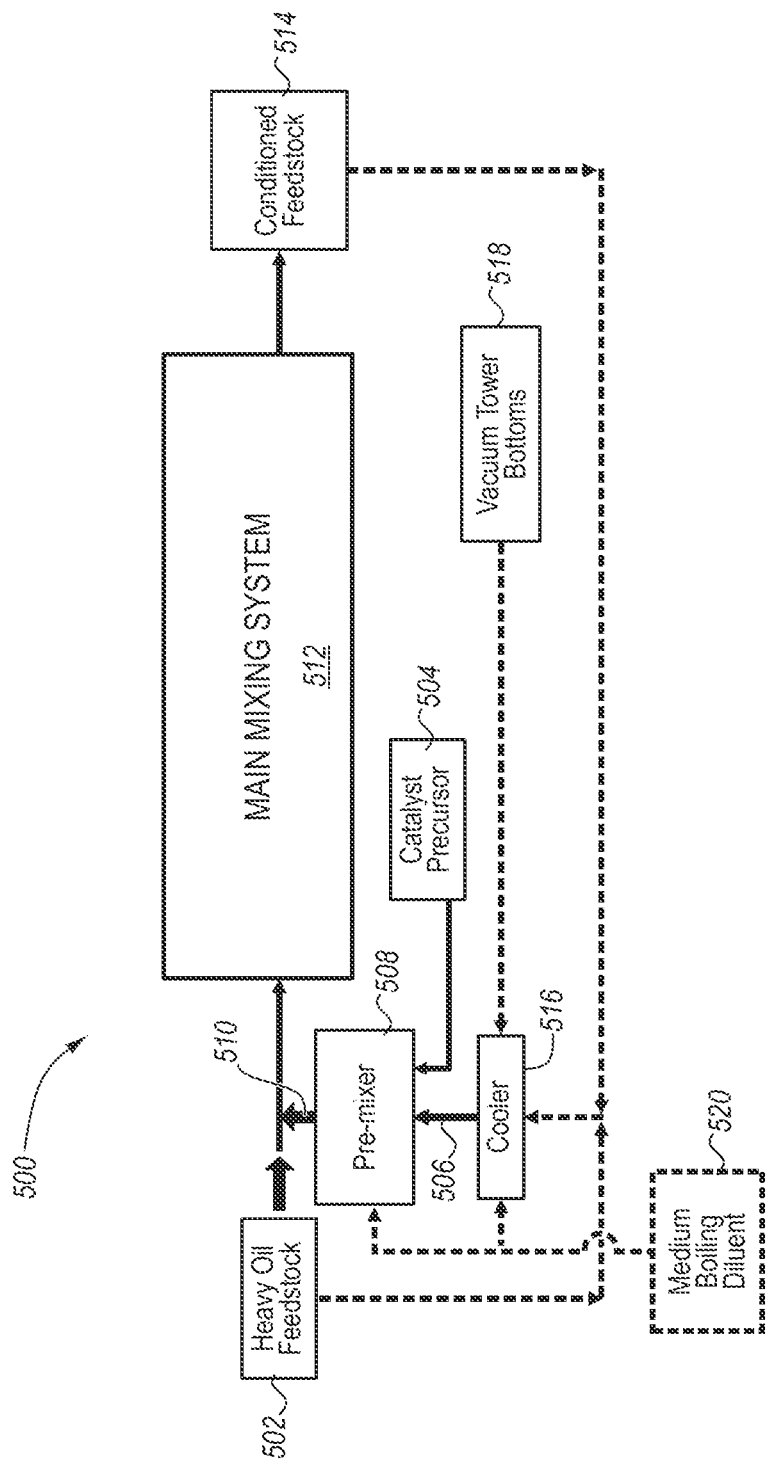
FIG. 5 schematically illustrate an exemplary mixing system for blending a catalyst precursor into a heavy oil feedstock using a high boiling hydrocarbon diluent.
Figure 6:
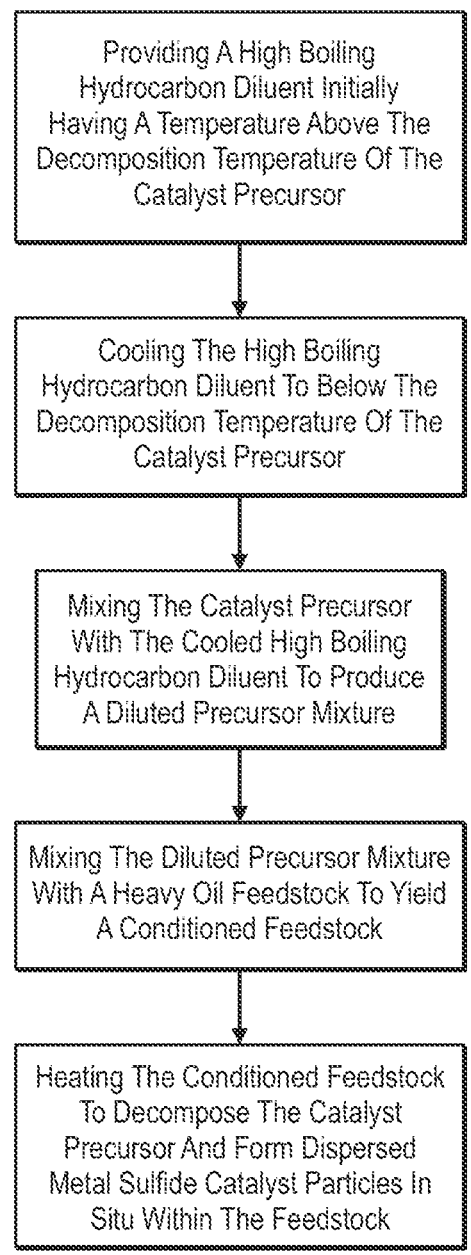
FIG. 6 is a flow diagram that schematically illustrates an exemplary process for preparing a conditioned heavy oil feedstock using a catalyst precursor and a high boiling hydrocarbon diluent.

IV. Methods and Systems for Mixing a Catalyst Precursor into Heavy Oil Using a High Boiling Hydrocarbon Diluent FIG. 5 illustrates an example mixing system and corresponding method for producing a conditioned heavy oil feedstock using one or more high boiling hydrocarbons as diluent to form a diluted precursor mixture. FIG. 6 illustrates an example method for producing a well-mixed conditioned heavy oil feedstock using one or more high boiling hydrocarbons as diluent to form a diluted precursor mixture. FIGS. 7A-8B illustrate example mixing systems for mixing a catalyst precursor into a heavy oil feedstock using a diluted precursor mixture formed from a catalyst precursor and high boil hydrocarbon diluent.

FIG. 5 schematically illustrates an example mixing system 500 and its implied method for mixing a catalyst precursor 504 using a high boiling hydrocarbon diluent 506 into a heavy oil feedstock 502 to form a conditioned heavy oil feedstock 514. The high boiling hydrocarbon diluent 506 is initially mixed with the catalyst precursor 504 using a pre-mixer 508 to form a diluted precursor mixture 510. A medium boiling hydrocarbon diluent 520 can optionally be added to the pre-mixer 508 and/or cooler 516 to form a blended high boiling hydrocarbon diluent, used to make the diluted precursor mixture 510, which is then mixed with the heavy oil feedstock 502 by means of a main mixing system 512 to form the conditioned feedstock 514. The main mixing system 512 can include one or more static in-line mixers and/or one or more high shear mixers.

The high boiling hydrocarbon diluent 506 includes at least one high boiling hydrocarbon material having a nominal boiling point of at least 524° C., which has been cooled prior to being mixed with the catalyst precursor 504 using a cooler 516. The cooler may include one or more heat exchangers or other cooling equipment known in the art. In some embodiments, the high boiling hydrocarbon diluent 506 comprises a portion of the heavy oil feedstock 502. To accomplish this, a line provides a side stream of the heavy oil feedstock 502 to the cooler 516. In other embodiments, the high boiling hydrocarbon diluent 506 comprises a portion of the conditioned heavy oil feedstock 514. To accomplish this, a line provides a side stream of the conditioned feedstock 514 to the cooler 516. In yet other embodiments, the high boiling hydrocarbon diluent 506 comprises a vacuum tower bottoms product 518, such as from a vacuum distillation tower used to separate upgraded products from a hydroprocessing system, such as from a hydroprocessing system illustrated in FIGS. 2-4B. In still other embodiments, the high boiling hydrocarbon diluent comprises deasphalted oil (not shown) or other high boiling hydrocarbon or heavy oil from a process (not shown).

The medium boiling hydrocarbon diluent 520, which optionally can be used with and/or form part of the high boiling hydrocarbon diluent 506 and catalyst precursor 504 to form the diluted precursor mixture 510, may include one or more medium boiling hydrocarbons having a nominal boiling point in a range of about 200° C. to about 524° C. Nonlimiting examples include vacuum gas oil, atmospheric gas oil, and cycle oil.

The main mixing system 512 used to mix the diluted precursor mixture 510 with the heavy oil feedstock 502 can include any mixer or combination of mixers capable of blending the diluted precursor mixture 510 into the heavy oil feedstock 502. Examples include mixing equipment illustrated in FIGS. 7A-8B and discussed more fully below. Examples of mixers that can be included in the main mixing system 512 include, but are not limited to, one or more static in-line mixers, one or more high shear mixers, a surge tank, and/or one or more high pressure pumps used to introduce the conditioned feedstock 514 into a hydroprocessing reactor (not shown).

FIG. 6 is a flow chart that illustrates an example method for forming a well-mixed and conditioned feedstock comprising a catalyst precursor that is thoroughly mixed, e.g., substantially homogeneously blended, with a heavy oil feedstock. the well-mixed conditioned feedstock can be heated to form dispersed metal sulfide catalyst particles in situ within the heavy oil feedstock.

A first step includes providing a high boiling hydrocarbon diluent that is to be mixed with a catalyst precursor to form a diluted precursor mixture. The high boiling hydrocarbon diluent may include one or more high boiling hydrocarbon materials, such as one or more of a portion of the heavy oil feedstock, a portion of the conditioned feedstock, a vacuum tower bottoms product from crude oil distillation or a hydroprocessing system, a deasphalted oil, or other hydrocarbon material having a nominal boiling point of at least about 350° C., preferably at least about 400° C., more preferably a at least about 450° C., and most preferably at least about 500° C., such as at least about 524° C.

In some embodiments, the high boiling hydrocarbon diluent will be at a temperature that is too high for mixing with the catalyst precursor, e.g., because it will cause premature thermal decomposition and agglomeration of the precursor before it can be adequately mixed with the high boiling hydrocarbon diluent to form a diluted precursor mixture. For example, the heavy oil feedstock may be maintained at a temperature in a range of about 125° C. to about 200° C. depending on its viscosity properties. The conditioned feedstock (after addition and mixing of dispersed catalyst) can be at an even higher temperature of about 160° C. to about 300° C. The vacuum tower bottoms product of a hydroconversion process or unit can also be at a higher temperature of about 150° C. to about 300° C.

In such cases, the method includes the step of cooling the high boiling hydrocarbon diluent to below the decomposition temperature of the catalyst precursor. This can be accomplished using coolers known in the art, such as one or more heat exchangers. Depending on the high boiling hydrocarbon diluent(s) being used, care should be taken to cool the high boiling hydrocarbon diluent sufficiently to prevent significant thermal decomposition of the catalyst precursor when mixed therewith, while ensuring the temperature remains high enough for the high boiling hydrocarbon diluent to be able to flow through mixing equipment and conduits. To address this issue, the present invention provides a cooler which controls the temperature of the high boiling hydrocarbon diluent. Selection and control of this temperature is critical, as it must be high enough to allow the high boiling hydrocarbon material to be of sufficiently low viscosity to be flowable and mixable, but low enough to avoid the undesirable agglomeration of catalyst precursor. In light of the foregoing, the high-boiling diluent can be cooled to a temperature in a range of about 75° C. to about 150° C. Preferably, the temperature can be cooled to a temperature in a range of about 75° C. to about 125° C. More preferably, the temperature can be cooled to a temperature in a range of about 75° C. to about 95° C.

In some embodiments, at least a portion of the cooling can be provided by optionally mixing the high boiling hydrocarbon diluent with a medium boiling hydrocarbon diluent that is already at a temperature below the decomposition temperature of the catalyst precursor. The extent of any such cooling will depend on the temperature of the high boiling hydrocarbon diluent, the temperature of the medium boiling hydrocarbon diluent, the relative amounts of high and medium boiling hydrocarbon diluents, and the target temperature of the combined diluents.

When the temperature of the high boiling hydrocarbon diluent has been appropriately adjusted to be compatible with the catalyst precursor, the process includes the step of mixing the catalyst precursor with the cooled high boiling hydrocarbon diluent to produce a diluted precursor mixture. This can be carried out using one or more mixers known in the art and/or disclosed herein. The catalyst precursor is advantageously mixed with the hydrocarbon diluent below a temperature at which a significant portion of the catalyst precursor decomposes. The mixing may be performed at temperature in a range of about 40° C. (104° F.) to about 250° C. (482° F.), or in range of about 60° C. (140° F.) to about 200° C. (392° F.), or in a range of about 75° C. (167° F.) to about 125° C. (257° F.), to form the diluted precursor mixture. The temperature at which the diluted precursor mixture is formed may depend on the decomposition temperature and/or other characteristics of the catalyst precursor that is utilized and/or characteristics of the hydrocarbon diluent, such as viscosity.

The duration of mixing can be in a range of about 0.1 second to about 5 minutes, or in a range of about 0.5 second to about 1 minute, or in a range of about 1 second to about 10 seconds.

The ratio of catalyst precursor to hydrocarbon diluent is preferably in a range of about 1:1000 to about 1:1, more preferably in a range of about 1:500 to about 1:10, and most preferably in a range of about 1:300 to about 1:50 (e.g., 1:600, 1:400, 1:300, 1:200, 1:100, or 1:60) on a weight basis. The amount of catalyst metal (e.g., molybdenum) in the diluted precursor mixture is preferably in a range of about 100 ppm to about 7000 ppm, more preferably in a range of about 300 ppm to about 4000 ppm, by weight of the diluted precursor mixture (e.g., 250 ppm, 500 ppm, 750 ppm, or 2500 ppm by weight).

The diluted precursor mixture is them mixed with the heavy oil feedstock using one or more mixers to form a conditioned heavy oil feedstock. The mixers used in this step can be any mixer or combination of mixers capable of blending the diluted precursor mixture into the heavy oil feedstock, such as one or more static in-line mixers, one or more high shear mixers, a surge tank, and/or one or more high pressure pumps used to introduce the conditioned feedstock into a hydroprocessing reactor.

The step of mixing the diluted precursor mixture with the heavy oil feedstock can be in a range of about 0.1 second to about 5 minutes, or in a range of about 0.5 second to about 3 minutes, or in a range of about 1 second to about 1 minute.

The heavy oil feedstock and diluted precursor mixture are advantageously mixed at a temperature in a range of about 40° C. (104° F.) to about 350° C. (662° F.), or in a range of about (140° F.) to about 300° C. (572° F.), or in a range of about 75° C. (167° F.) to about 250° C. (482° F.) to yield a conditioned feedstock.

Because the catalyst precursor is premixed with a hydrocarbon diluent to form a diluted precursor mixture, which is thereafter mixed with a heavy oil feedstock, it may be permissible for the feedstock to be at or above the decomposition temperature of the catalyst precursor. In some cases, the hydrocarbon diluent shields the individual catalyst precursor molecules and prevents them from agglomerating to form larger particles, temporarily insulates the catalyst precursor molecules from heat from the heavy oil during mixing and facilitates dispersion of the catalyst precursor molecules sufficiently quickly throughout the feedstock before decomposing to liberate metal. In addition, additional heating of the feedstock may be necessary to liberate hydrogen sulfide from sulfur-bearing molecules in the heavy oil to form the metal sulfide catalyst particles. In this way, progressive dilution of the catalyst precursor permits a high level of dispersion within the heavy oil, resulting in the formation of highly dispersed metal sulfide catalyst particles, even where the feedstock is at a temperature above the decomposition temperature of the catalyst precursor.

The high boiling hydrocarbon diluent can be used in amounts ranging from 0.1% to 10%, or about 0.5% to about 5%, by volume of the total feedstock going to the hydroprocessing unit. The sources of high-boiling diluent (e.g., heavy oil feedstocks, conditioned heavy oil feedstock, vacuum residue, deasphalted heavy oil, and vacuum tower bottoms) may be used individually at 0.1% to 10%, or about 0.5% to about 5%, of the total heavy oil feedstock, or they may be used in any combination that totals 0.% to 10% or about to about 5%, of the total heavy oil feedstock. Such high boiling hydrocarbon diluent sources may optionally be combined with one or more medium boiling hydrocarbons individually, or with one or more heavy boiling diluent sources in any combination that totals 0% to 10% of the total heavy oil feedstock.

In some embodiments, the conditioned feedstock is preheated using one or more heaters known in the art. This raises the temperature to above the decomposition temperature of the catalyst precursor, which liberates catalyst metal therefrom, which can react with sulfur present in and/or added to the heavy oil feedstock (e.g., as hydrogen sulfide gas) to form active dispersed metal sulfide catalyst particles in situ within the heavy oil.

Figure 7A:
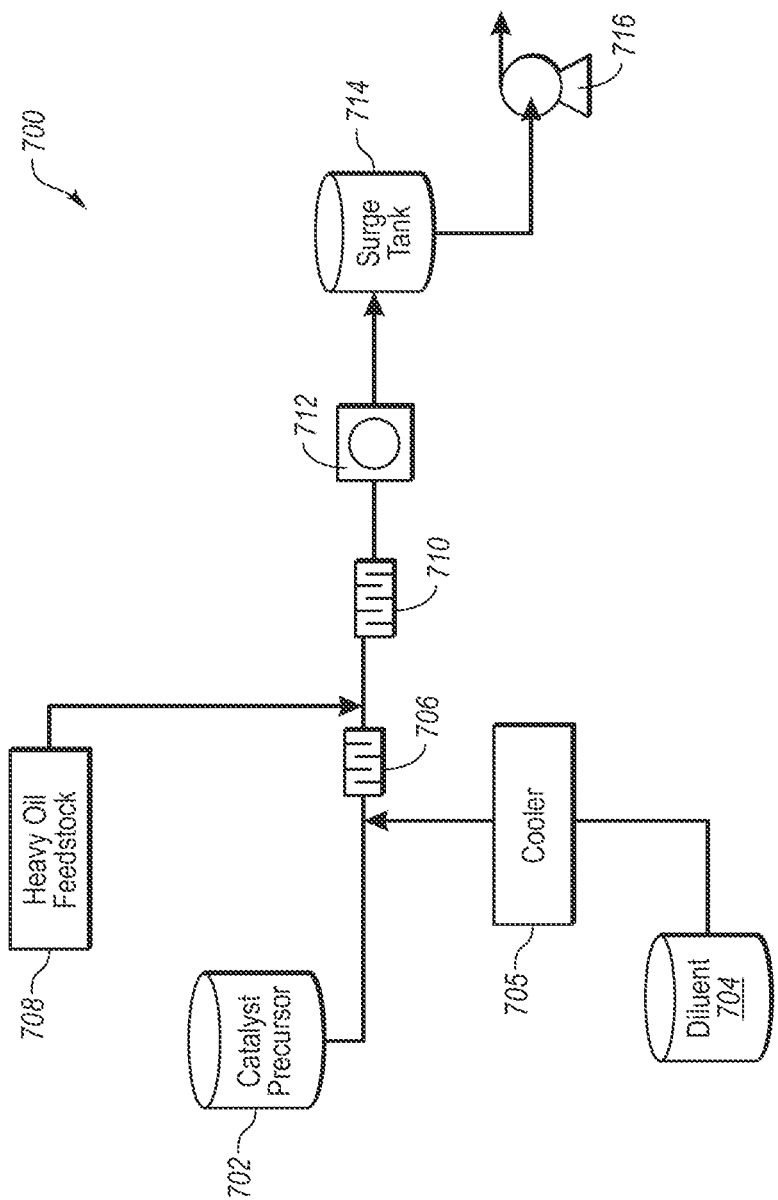
FIGS. 7A-7B schematically illustrate exemplary systems for preparing a conditioned heavy oil feedstock using a catalyst precursor and a high boiling hydrocarbon diluent.

FIG. 7A schematically illustrates an exemplary system 700 for mixing a catalyst precursor 702 into a heavy oil feedstock 708 to form a conditioned feedstock. Catalyst precursor 702 is first mixed with a hydrocarbon oil diluent 704 by means of a first static in-line low shear mixer 706 to advantageously form a diluted precursor mixture. The catalyst precursor 702 is preferably oil soluble. The hydrocarbon oil diluent 704 includes one or more high boiling hydrocarbon materials and optionally one or more medium boiling materials.

The catalyst precursor composition 702 is advantageously mixed with the hydrocarbon oil diluent 704 at a temperature below which a significant portion of the catalyst precursor composition 702 starts to decompose. It will be appreciated that the actual temperature at which the diluted precursor mixture is formed typically depends largely on the decomposition temperature of the particular precursor composition that is used. Where the hydrocarbon oil diluent 704 is initially too hot, e.g., hotter than the decomposition temperature of the catalyst precursor 702, it is first passed through a cooler 705 to reduce its temperature, e.g., to below the decomposition temperature of the catalyst precursor 702.

The degree of initial mixing achieved within the in-line mixer 706 is dependent, at least in part, on the number of stages within the low shear, static in-line mixer. In one embodiment, mixer 706 is characterized as including between about 2 and about 20 stages, preferably between about 7 and about 15 stages, and more preferably between about 8 and about 12 stages. In mixing theory, each "stage" is substantially equivalent to having a vessel that is vigorously stirred. Because mixing is imperfect (i.e., there is some short circuiting of the vessel by the components to be mixed), the degree of mixing is improved if a series of mixing vessels (i.e., stages) are used. An exemplary static in-line mixer 706 includes no moving parts but a plurality of internal baffles or other elements inside a tube or other housing. The internal baffles or other elements channel the flowing fluid in many different directions by repeatedly dividing and recombining the fluid in a turbulent manner so as to mix the various components. The number of stages in a static in-line mixer empirically correlates to the degree of mixing that can be expected within the static mixer when compared to the degree of mixing that would occur if using a series of mixing vessels (i.e., the fluid leaving the first vessel enters the second vessel for mixing, the fluid leaving the second vessel enters the third vessel, and so on). In other words, a static in-line mixer characterized as including 10 stages provides a degree of mixing that is substantially equivalent to that provided by a mixing system comprising a series of 10 mixing vessels.

Diluting the catalyst precursor with a hydrocarbon diluent prior to mixing with the heavy oil feedstock is helpful in achieving thorough blending of the precursor within the heavy oil feedstock because the hydrocarbon oil diluent is more easily blended with the heavy oil feedstock than the catalyst precursor by itself. It is important that the catalyst precursor be pre-mixed with the hydrocarbon diluent and that care be taken in the overall method and mixing system to mix the components for a time sufficient to thoroughly blend the precursor with the feedstock before substantial decomposition of the precursor has occurred.

Advantageously, it has been found that pre-blending the precursor composition 702 with a hydrocarbon diluent 704 prior to blending the diluted precursor mixture with the heavy oil feedstock 708 greatly aids in thoroughly and intimately blending the precursor composition 702 within the feedstock 708. Forming a diluted precursor mixture advantageously shortens the overall mixing time by (1) reducing or eliminating differences in solubility between the more polar catalyst precursor 702 and the heavy oil feedstock 708, (2) reducing or eliminating differences in viscosity between the catalyst precursor composition 702 and the heavy oil feedstock 708, and/or (3) breaking up bonds or associations between clusters of catalyst precursor molecules to form a solute within the hydrocarbon diluent 704, which is much more easily dispersed within the heavy oil feedstock 708.

It is particularly advantageous to first form a diluted precursor mixture when the heavy oil feedstock 708 contains water (e.g., condensed water). Otherwise, the greater affinity of the water for the polar catalyst precursor 702 can cause localized agglomeration of the precursor, resulting in poor dispersion and formation of micron-sized or larger catalyst particles. The hydrocarbon diluent 704 is preferably substantially water free (i.e., contains less than about water) to prevent formation of substantial quantities of micron-sized or larger catalyst particles.

The diluted precursor mixture is then combined with the heavy oil feedstock 708 and mixed for a time sufficient and in a manner so as to disperse the catalyst precursor throughout the feedstock and yield a conditioned feedstock in which the precursor is thoroughly mixed within the heavy oil feedstock. In the illustrated mixing system 700, the heavy oil feedstock 708 and the diluted precursor mixture are blended in a second low shear, static in-line mixer 710. Similar to first mixer 706, the second mixer 710 preferably includes between 2 stages and 20 stages, more preferably between 7 stages and 15 stages, and most preferably between 8 and 12 stages.

The second static in-line mixer 710 is followed by a dynamic high shear mixer 712 (e.g., a vessel with a propeller or turbine impeller for providing very turbulent, high shear mixing). An example of a suitable dynamic high shear mixer is the 800LS in-line mixer, manufactured by Silverson Machines, Ltd., located in Waterside, England. The mixing time in the static in-line mixer depends on the number of stages and the volumetric flow of the components. Increasing the vigorousness and/or shearing energy of the mixing process within the high shear mixer 712 can reduce the mixing time required to effect thorough mixing of catalyst precursor 702 within the heavy oil feedstock 708. The mixing time in the static in-line mixer 710 may advantageously comprise a majority of the total mixing time. Such a configuration uses the pressure drop of the static mixer 710 to advantageously achieve a degree of mixing, followed or preceded by additional mixing within the high shear mixer 712.

Additional apparatus may be included downstream within the system 700 for providing additional mixing of the catalyst precursor so as to effect high dispersion within the heavy oil feedstock 708. For example, the static in-line mixer 710 and high shear mixer 712 (or another mixing configuration) can be followed by a surge tank 714 with recirculation pump(s), and optionally one or more multistage centrifugal pumps and a second surge tank. Further mixing can be carried out using a high energy pump 716 having multiple chambers within which the catalyst precursor and heavy oil feedstock are churned and mixed as part of the pumping process itself used to deliver the conditioned feedstock to a hydroprocessing reactor.

Through molecular diffusion, the catalyst precursor 702 within the surge tank 714 continues to diffuse even more completely throughout the heavy oil feedstock 708. Finally, the conditioned feedstock is pumped out of surge tank 714, through pump 716, and delivered to a reactor system for hydroprocessing of the heavy oil feedstock. As described above, the pump 716 may advantageously comprise a multistage high pressure pump. Because of the multiple compression stages, such pump provides further intense mixing of the conditioned feedstock, ensuring thorough mixing of the catalyst precursor 702 within the feedstock 708 if such mixing has not already been accomplished.

Figure 7B:
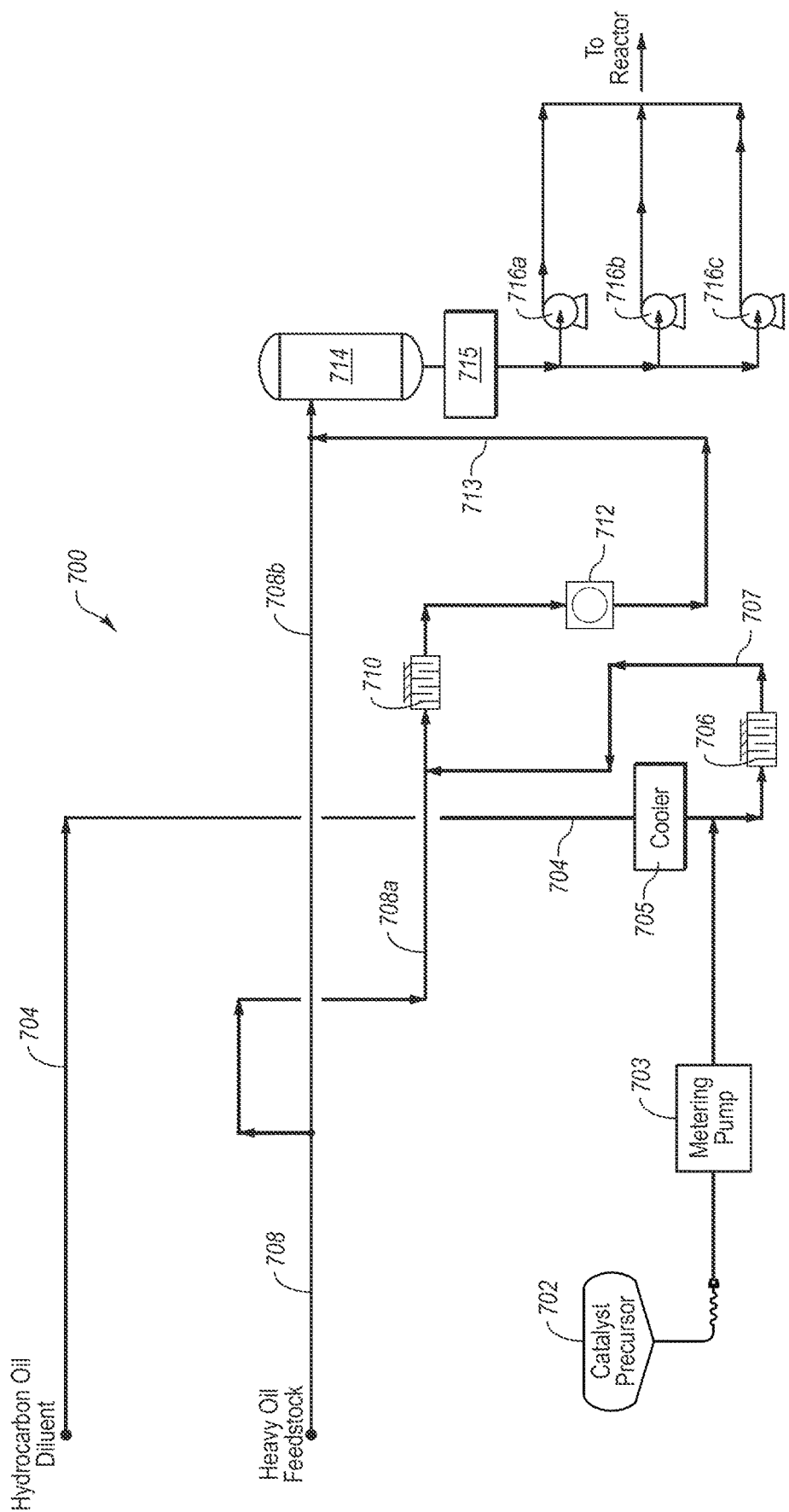

FIG. 7B schematically illustrates another exemplary system 700 for intimately mixing a catalyst precursor 702 with a heavy oil feedstock 708. The catalyst precursor 702 is metered through a metering pump 703 to deliver a desired flow rate. The catalyst precursor 702 is then mixed with a high boiling hydrocarbon oil diluent 704 in a first static in-line mixer 706 to form a diluted catalyst mixture 707.

The catalyst precursor 702 is mixed with the hydrocarbon oil diluent 704 at a temperature below which a significant portion of the catalyst precursor 702 starts to decompose. Where the hydrocarbon oil diluent 704 is initially too hot, e.g., hotter than the decomposition temperature of the catalyst precursor 702, it is first passed through a cooler 705 to reduce its temperature, e.g., to below the decomposition temperature of the catalyst precursor 702. The diluted precursor mixture 707 is then combined with the heavy oil feedstock 708 in a static in-line mixer 710 to form a conditioned feedstock in which the precursor 702 is thoroughly mixed with the heavy oil feedstock 708. In the illustrated system 700, the heavy oil feedstock 708 is divided into two streams, 708a and 708b for progressive mixing with the diluted precursor mixture 707. The partial stream 708b is illustrated as being added directly to a surge tank 714.

The diluted precursor mixture 707 is blended with the first heavy oil feedstock stream 708a in a second low shear, static in-line mixer 710. The effluent from mixer 710 comprises a mixture of diluent 704, catalyst precursor 702, and a portion of heavy oil feedstock 708. The effluent is introduced into a dynamic, high shear mixer 712 (e.g., a vessel with a propeller or turbine impeller for providing very turbulent, high shear mixing), which acts to intimately blend the catalyst precursor and the heavy oil feedstock. The effluent 713 from the high shear mixer 712 is introduced along with any remaining heavy oil feedstock 708b into the surge tank 714.

Additional apparatus may be included downstream for providing even more thorough mixing of the catalyst precursor within the heavy oil feedstock. For example, the static in-line mixer 710 and high shear mixer 712 (or other mixing configuration) may be followed by a pump around in the surge tank 714, and/or one or more high pressure multi-stage centrifugal pumps. For example, the static in-line mixer 710 and high shear mixer 712 (or another mixing configuration) can be followed by a warm surge tank 714 (e.g., multiple warm surge tanks arranged in parallel or in series) with multiple recirculation pumps, and optional equipment 715, such as one or more multi-stage centrifugal pumps and/or a hot surge tank. Illustrated system 700 further includes pumps 716a, 716b, 716c arranged in parallel, which will be discussed further below and which can effect further mixing.

In the mixing system 700 of FIG. 7B, only a portion of the heavy oil feedstock 708 (i.e., stream 708a) is initially mixed with the diluted precursor mixture 707. Although illustrated as dividing feedstock 708 into two streams 708a and 708b, it is understood that all of the heavy oil feedstock 708 may be added at once (i.e., there may be no division of feedstock 708) or feedstock 708 may be divided into more streams for progressively blending with the catalyst precursor 702. The conditioned feedstock 713 may be introduced along with any remaining heavy oil feedstock 708b into the surge tank 714 (e.g., one or more warm surge tanks in series or in parallel, with multiple recirculation pumps, followed by optional equipment 715, such centrifugal pumps and hot surge tank). The surge tank(s) 714 may be used to more fully diffuse the catalyst precursor 702 throughout the heavy oil feedstock 708. The surge tank 714 may provide a residence time between 5 minutes and 60 minutes, or between 10 minutes and 50 minutes, or between 15 minutes and 30 minutes. Through diffusion, the catalyst precursor 702 within the surge tank 714 continues to diffuse more completely throughout the heavy oil feedstock 708 preparatory to heating and decomposition to form the dispersed catalyst.

Thereafter, the conditioned feedstock is pumped out of surge tank(s) 714 and optional equipment 715 by pumps 716a, 716b, 716c and delivered to a reactor for hydroprocessing of the heavy oil feedstock. The pumps 716a, 716b, 716c may comprise multi-stage high pressure pumps. When configured with the multiple compression stages (e.g., more than about ten), such pumps 716 provide further intense mixing of the conditioned feedstock, ensuring thorough mixing of the catalyst precursor 702 within the feedstock 708. The conditioned feedstock delivered to the hydroprocessing reactor includes the catalyst precursor dispersed throughout the heavy oil feedstock down to the molecular level, such that upon heating and decomposition of the precursor to form the catalyst, the catalyst particles are advantageously colloidal or molecular in size and highly dispersed.

The illustrated embodiment advantageously includes three pumps in parallel (e.g., pumps 716a, 716b, and 716c). Configuring the system so that the pumps 716 are in parallel provides for increased flow rate of conditioned feedstock delivered to a downstream hydroprocessing reactor. In alternative embodiments, pumps may be situated so as to be in series or a combination of series and parallel pumps. Placing pumps in series effectively increases the number of intense mixing stages through which the conditioned feedstock passes. For example, two pumps in series each including five stages could be used instead of a single pump including ten stages to achieve substantially the same intimate mixing of the catalyst precursor within the heavy oil feedstock so as to yield a conditioned feedstock. In either configuration, the result is that the catalyst precursor is homogeneously dispersed on a colloidal and/or molecular level within the feedstock so that upon heating, formation of highly dispersed metal sulfide catalyst particles results.

Figure 8A:
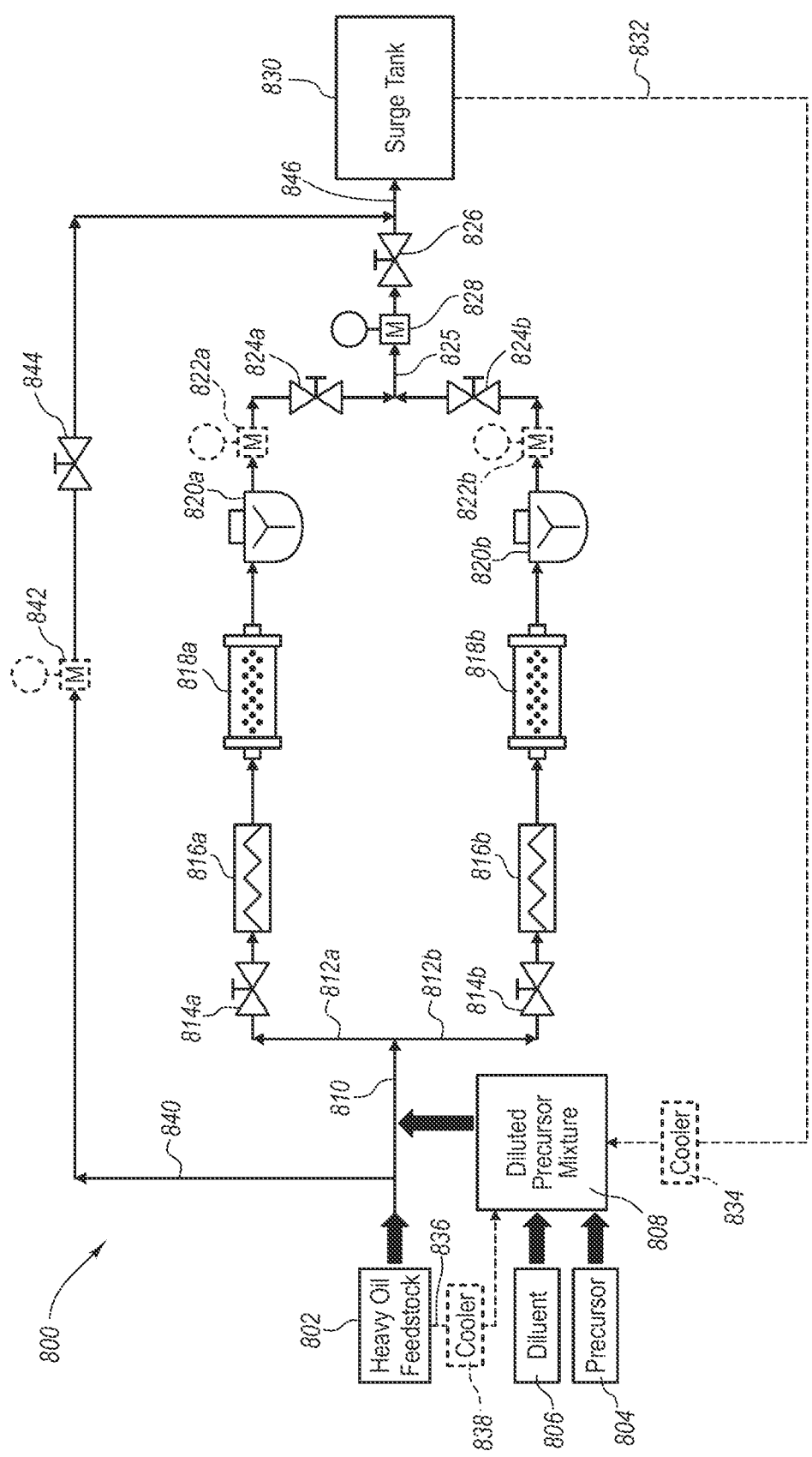
FIGS. 8A-8B schematically illustrate other exemplary mixing systems having parallel mixing lines and a bypass line for preparing a conditioned heavy oil feedstock using a catalyst precursor and a high boiling hydrocarbon diluent.
Figure 8B:
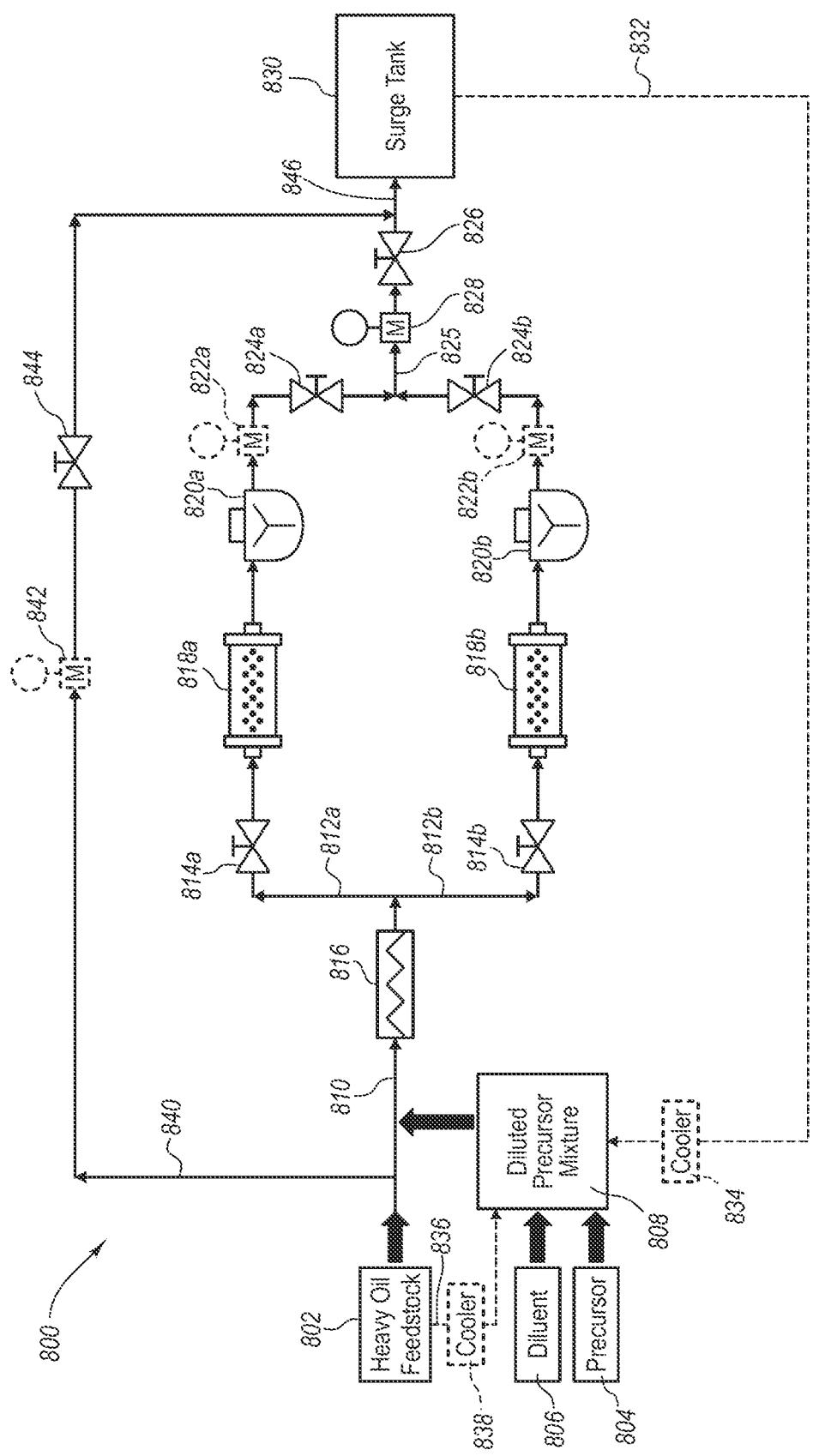

FIGS. 8A-8B illustrate mixing systems 800 that are configured to mix a heavy oil feedstock 802 with a diluted precursor mixture 808. The diluted precursor mixture 808 is formed by mixing a catalyst precursor 804 (e.g., an oil soluble catalyst precursor) with a high boiling hydrocarbon diluent 806 using one or more mixers known in the art, such as one or more static in-line mixers and/or one or more high shear mixers. The heavy oil feedstock 802 and diluted precursor mixture 808 are fed into a common feed line 810, which is split into first and second parallel mixing lines 812a, 812b.

A heavy oil feedstock side stream 836 can optionally be used as a diluent to make the diluted precursor mixture 808. A cooler 838 can be used to reduce the temperature of the heavy oil feedstock side stream 836 to prevent premature thermal decomposition of the catalyst precursor 804 in the diluted precursor mixture 808 prior to being thoroughly mixed with the heavy oil feedstock 802.

Each mixing line 812a, 812b may include an upstream valve 814a, 814b, which can be selectively opened during operation of the mixing lines 812a, 812b and closed to take a mixing line 812 offline for maintenance and cleaning. When online, the upstream valves 814a, 814b are open to permit the divided streams of the heavy oil feedstock 802 and diluted precursor mixture 808 to flow through the first and second mixing lines 812*a*, 812*b*. In a preferred embodiment, the first and second parallel mixing lines 812*a*, 812*b* are designed with symmetrical piping and mixing equipment so that pressure drop is substantially equal through each parallel mixing line 812 and equal flow between the different mixing lines 812 can be maintained. Nevertheless, mixing lines 812 of different capacity and flow can used, such as when retrofitting a single-train mixing line to include one or more additional mixing lines.

In the mixing system 800 shown in FIG. 8A, the divided streams of heavy oil feedstock 802 and diluted precursor mixture 808 pass through first and second static inline mixers 816*a*, 816*b* for initial mixing to produce first and second initial mixed streams, which then pass through first and second strainers 818*a*, 818*b* to remove any undesirable solids in the initial mixed streams. The first and second mixed streams are then fed into first and second high shear mixers 820*a*, 820*b*, which provide first and second conditioned feedstock streams. Optional first and second flow meters 822*a*, 822*b* can be provided to measure flow through the first and second mixing lines 812*a*, 812*b* downstream from the first and second high shear mixers 820*a*, 820*b*.

FIG. 8B is similar to FIG. 8A, except that a common static inline mixer 816 is positioned on the common feed line 810 and functions as a pre-mixer upstream from where the first and second parallel mixing lines 812*a* and 812*b* diverge, and the individual static inline mixers 816*a*, 816*b* in the mixing lines 812*a* and 812*b* are omitted.

First and second flow control devices 824*a*, 824*b* are positioned downstream from the high shear mixers 820*a*, 820*b*, respectively. The flow control devices 824*a*, 824*b* can provide multiple functions. When the first and second parallel mixing lines 812*a*, 812*b* are both online, the flow control devices 824*a*, 824*b* will be open. When one of the mixing lines 812 is taken offline, the corresponding flow control device 824 can be closed to prevent backup of pressurized conditioned feedstock from the other mixing line 812 still in operation. The flow control device 824 of the mixing line 812 that is still in operation can be open all the way or, alternatively, can be partially closed to restrict flow and increase upstream pressure to cause or allow a portion of the heavy oil feedstock 802 to enter a bypass line 840.

The conditioned feedstock streams from the first and second mixing lines 812*a*, 812*b* are fed into and combined in a common discharge line 825 to form a common conditioned feedstock stream 846. The common conditioned feedstock stream 846 passes through or past a common flow measurement device 828 (e.g., flow meter) and then through a common flow control device 826 (e.g., valve), is recombined with any heavy oil feedstock from bypass line 840, and then enters a surge tank 830.

A conditioned feedstock side stream 832 from the surge tank 830 can optionally be used as a diluent to make the diluted precursor mixture 808. A cooler 834 can be used to reduce the temperature of the conditioned feedstock side stream 832 to prevent premature thermal decomposition of the catalyst precursor 804 in the diluted precursor mixture 808 prior to being thoroughly mixed with the heavy oil feedstock 802.

When both of the parallel mixing lines 812*a*, 812*b* are online and operational, the common flow control device 826 is open. When one of the mixing lines 812*a*, 812*b* is closed and taken offline, the common flow control device 826 can be partially closed to restrict flow of material through the common discharge line 825 and increase upstream pressure to cause or allow a portion of the heavy oil feedstock to enter the bypass line 840. The common flow control device 826 can be used alone or in combination with one of the flow control devices 824 corresponding to the mixing line 812 that is still in operation.

The bypass line 840 typically does not have heavy oil feedstock 802 flowing through it when both the first and second mixing lines 812*a*, 812*b* are online and in operation. However, when one of the parallel mixing lines 812 is closed and taken offline, the portion of the heavy oil feedstock 802 not fed into the remaining online mixing line 812 is caused or allowed to pass through the bypass line 840 to maintain throughput of the heavy oil feedstock 802 through the mixing system 800. As discussed above, flow of heavy oil feedstock 802 though the bypass line 840 is caused or induced by restricting flow through the common discharge line 825 by partially closing common flow control valve 826 and/or the mixing line valve 824 of the operational mixing line 812. This induces a pressure drop and increases upstream pressure sufficient to cause a portion of the heavy oil feedstock 802 to enter the bypass line 840. An optional flow meter 842 on the bypass line 840 measures the flow rate of heavy oil feedstock 802 passing through the bypass line 840. The bypass line 840 is joined to the common discharge line 825 to combine the heavy oil feedstock 808 from the bypass line with the common conditioned feedstock stream 846 downstream from the flow control device 826 and the flow meter 828.

The flow rate of divided heavy oil feedstock streams that are passed respectively through the remaining operational mixing line 812 and the bypass line 840 can be measured, respectively, by the common flow meter 828 and optionally the bypass flow meter 842. The respective flow rates of material through the remaining operational mixing line 812 and the bypass line 840 can be adjusted by making adjustments to the common flow control valve 826 and/or a bypass line valve 844. By measuring flow rates using flow meters and making adjustments using flow control devices, a desired balance of flow through the various lines can be achieved and maintained. In addition to adjusting flow rate through the bypass line 840, the bypass line valve 844 can be closed or partially restricted to balance line pressure to ensure that heavy oil feedstock 802 does not pass through the bypass line 840, either in a forward or backward direction, when the first and second mixing lines 812*a*, 812*b* are open and operational.

An example method for mixing a catalyst precursor into heavy oil comprises using the mixing system 800 illustrated in FIG. 8A, comprises:

(1) blending a quantity of catalyst precursor 804 with a quantity of diluent 806 to form a diluted precursor mixture 808;

(2) mixing the diluted precursor mixture 808 with a heavy oil feedstock 802 using a plurality of parallel mixing lines 812 to form a plurality of conditioned feedstock streams, each parallel mixing line 812 including one or more mixers 816, 820 and at least one valve 814, 824 for regulating flow in the mixing line 812;

(3) combining the conditioned feedstock streams in a common discharge line 825 downstream from the parallel mixing lines 812 to form a common conditioned feedstock stream 846;

(4) stopping flow through a mixing line 812 and causing or allowing a portion of the heavy oil feedstock 802 to enter a bypass line 840, bypass the parallel mixing lines 812, and combine with the common conditioned feedstock stream 846 in the common discharge line 825; and (5) while the portion of the heavy oil feedstock 802 is passing through the bypass line 840, continuing to mix at least a portion of the diluted precursor mixture 808 with a remaining portion of the heavy oil feedstock 802 using at least one other of the parallel mixing lines 812.

When using the alternative mixing system 800 illustrated in FIG. 8B, the method alternatively includes the step of pre-mixing the diluted precursor mixture 808 with the heavy oil feedstock 802 using the common static inline mixer 816 upstream from where the first and second mixing lines 812a, 812b diverge. This method also omits mixing the diluted precursor mixture 808 with the heavy oil feedstock 802 using the static inline mixers 816a, 816b on the first and second mixing lines 812a, 812b illustrated in FIG. 8A.

A hydroprocessing system may have a defined flow rate of heavy oil. When operating both of first and second parallel mixing lines 812a, 812b, it may be advantageous or preferable to divide the heavy oil feedstock 802 equally so that there is symmetrical (e.g., equal) flow of material through each of the first and second parallel mixing lines 812a, 812b (e.g., half the defined system flow rate through each mixing line 812a, 812b).

When one of the mixing lines 812 is closed and taken offline, a portion of the heavy oil feedstock is rerouted through the bypass line 840 to maintain the same or similar defined flow rate of heavy oil feedstock 802 through the mixing system 800. By way of example and not limitation, for a mixing system 800 with a defined flow rate, the flow rate of heavy oil feedstock 802 through the bypass line 840 and remaining online mixing line 812 can be the same (e.g., approximately half the defined system flow rate through each line). In a preferred embodiment, the flow rate of heavy oil feedstock 802 through the remaining online mixing line 812 is increased to above half the defined flow rate and the flow rate of heavy oil feedstock 802 through the bypass line 840 is decreased to below half the defined flow rate.

Alternatively, it is possible for the flow rate of heavy oil feedstock 802 through the bypass line 840 to be greater than the flow rate through the remaining online mixing line 812. For example, the flow rate through the bypass line 840 is greater than half of the defined system flow rate. In order to maintain the same or similar flow rate of heavy oil feedstock through the system, the corresponding flow rate through the remaining online mixing line 812 can be reduced to less than half of the defined system flow rate.

In the case where a heavy oil feedstock side stream 836 is used as a diluent to make the diluted precursor mixture 808, and the flow rate of heavy oil feedstock 802 through the mixing system 800 is about 100 tonnes per hour, the amount of the heavy oil feedstock side stream 836 can be up to about 10 tonnes per hour, or up to about 5 tonnes per hour (or between about 0-10 tonnes per hour, or about 0-5 tonnes per hour, depending on conditions within the mixing system 500). Where the flow rate of heavy oil feedstock 802 through the mixing system 800 is less than or greater than 100 tonnes per hour, the flow rate of the heavy oil feedstock side stream 836 used as diluent to make the diluted precursor mixture 808 can be up to about 10%, or about 5%, of total flow (or between about 0.1-10%, or about 0.5-5%, of total flow depending on conditions within the mixing system 800).

In the case where a conditioned feedstock side stream 832 is used as a diluent to make the diluted precursor mixture 808, and the flow rate of heavy oil feedstock 802 through the mixing system 800 is about 100 tonnes per hour, the amount of the conditioned feedstock side stream 832 can be up to about 10 tonnes per hour, or up to about 5 tonnes per hour (or between about 0-10 tonnes per hour, or about 0-5 tonnes per hour, depending on conditions within the mixing system 800). Where the flow rate of heavy oil feedstock 802 through the mixing system 800 is less than or greater than 100 tonnes per hour, the flow rate of the conditioned feedstock side stream 832 used as diluent to make the diluted precursor mixture 808 can be up to about 10%, or about 5%, of total flow (or between about 0.1-10%, or about of total flow depending on conditions within the mixing system 800).

In some embodiments, dispersed metal sulfide catalyst particles are formed in situ within an entirety of the heavy oil added to the hydroprocessing reactors. This can be accomplished using the disclosed mixing methods and systems to initially mix a catalyst precursor with a diluent to form a diluted precursor mixture, which is then mixed with the entirety of the heavy oil in multiple parallel mixing lines to form parallel conditioned feedstock streams, which are combined into a common conditioned feedstock stream, periodically with heavy oil feedstock from the bypass line, and then heated to decompose the catalyst precursor and cause or allow catalyst metal to react with sulfur and/or sulfur-containing molecules in and/or added to the heavy oil to form the dispersed metal sulfide catalyst particles in situ.

The catalyst precursor can be oil-soluble and have a decomposition temperature in a range from about 100° C. to about 350° C., or in a range of about 150° C. to about 300° C., or in a range of about 175° C. to about 250° C. Example catalyst precursors include organometallic complexes or compounds, more specifically oil soluble compounds or complexes of transition metals and organic acids, having a decomposition temperature or range high enough to avoid substantial decomposition when mixed with a heavy oil feedstock under suitable mixing conditions. When mixing the catalyst precursor with a hydrocarbon oil diluent, it is advantageous to maintain the diluent at a temperature below which significant decomposition of the catalyst precursor occurs. One skilled in the art can select a mixing temperature profile that results in intimate mixing of a selected precursor composition without substantial decomposition prior to formation of the dispersed metal sulfide catalyst particles in situ.

Example catalyst precursors include, but are not limited to, molybdenum 2-ethylhexanoate, molybdenum octoate, molybdenum naphthenate, vanadium naphthenate, vanadium octoate, molybdenum hexacarbonyl, vanadium hexacarbonyl, and iron pentacarbonyl. Other catalyst precursors include molybdenum salts comprising a plurality of cationic molybdenum atoms and a plurality of carboxylate anions of at least 8 carbon atoms and that are at least one of (a) aromatic, (b) alicyclic, or (c) branched, unsaturated and aliphatic. By way of example, each carboxylate anion may have between 8 and 17 carbon atoms or between 11 and 15 carbon atoms. Examples of carboxylate anions that fit at least one of the foregoing categories include carboxylate anions derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), and combinations thereof.

In other embodiments, carboxylate anions suitable for use in making oil soluble, thermally stable, molybdenum catalyst precursor compounds are derived from carboxylic acids selected from the group consisting of 3-cyclopentylpropionic acid, cyclohexanebutyric acid, biphenyl-2-carboxylic acid, 4-heptylbenzoic acid, 5-phenylvaleric acid, geranic acid (3,7-dimethyl-2,6-octadienoic acid), 10-undecenoic acid, dodecanoic acid, and combinations thereof. It has been discovered that molybdenum catalyst precursors made using carboxylate anions derived from the foregoing carboxylic acids possess improved thermal stability.

Catalyst precursors with higher thermal stability can have a first decomposition temperature higher than 210° C., higher than about 225° C., higher than about 230° C., higher than about 240° C., higher than about 275° C., or higher than about 290° C. Such catalyst precursors can have a peak decomposition temperature higher than 250° C., or higher than about 260° C., or higher than about 270° C., or higher than about 280° C., or higher than about 290° C., or higher than about 330° C.

In the case of heavy oil feedstocks that are solid or extremely viscous at room temperature, such feedstocks may advantageously be heated in order to soften them and create a feedstock having sufficiently low viscosity so as to allow good mixing of the oil soluble catalyst precursor into the feedstock. In general, decreasing the viscosity of the heavy oil feedstock will reduce the time required to effect thorough and intimate mixing of the oil soluble precursor composition within the feedstock. However, it can also cause premature decomposition of the catalyst precursor. One can select a catalyst precursor having a decomposition temperature suitable for a given heavy oil feedstock.

After the catalyst precursor has been well-mixed throughout the heavy oil to yield a conditioned feedstock, this composition is heated to cause decomposition of the catalyst precursor, which liberates catalyst metal therefrom, causes or allows catalyst metal to react with sulfur within and/or added to the heavy oil, and forms the active metal sulfide catalyst particles in situ. Metal from the catalyst precursor may initially form a metal oxide, which then reacts with sulfur in the heavy oil to yield a metal sulfide compound that forms the final active catalyst. In the case where the heavy oil includes sufficient or excess sulfur, the final activated catalyst may be formed in situ by heating the feedstock to a temperature sufficient to liberate sulfur therefrom. In some cases, sulfur may be liberated at the same temperature that the catalyst precursor decomposes. In other cases, further heating to a higher temperature may be required. Hydrogen sulfide gas can be added to heavy oil that lack sufficient sulfur to form active metal sulfide catalyst particles.

If the catalyst precursor is thoroughly mixed throughout the heavy oil, at least a substantial portion of the liberated metal ions will be sufficiently sheltered or shielded from other metal ions so that they can form a molecularly-dispersed catalyst upon reacting with sulfur to form the metal sulfide compound. Under some circumstances, minor agglomeration may occur, yielding colloidal-sized catalyst particles. However, it is believed that taking care to thoroughly mix the catalyst precursor throughout the feedstock prior to thermal decomposition of the catalyst precursor may yield individual catalyst molecules rather than colloidal particles. Simply blending, while failing to sufficiently mix, the catalyst precursor with the feedstock typically causes formation of large, agglomerated metal sulfide compounds that are micron-sized or larger.

In order to form dispersed metal sulfide catalyst particles, the conditioned feedstock is heated to a temperature in a range of about 275° C. (527° F.) to about 450° C. (842° F.), or in a range of about 310° C. (590° F.) to about 430° C. (806° F.), or in a range of about 330° C. (626° F.) to about 410° C. (770° F.).

The concentration of catalyst metal provided by the dispersed metal sulfide catalyst particles in the heavy oil can depend on the type of reactor being employed. In the case where the dispersed metal sulfide catalyst is used together with a solid supported catalyst (e.g., ebullated bed reactor or fixed bed reactor), the concentration can be in a range of about 1 ppm to about 150 ppm by weight, or in a range of about 5 ppm to about 95 ppm by weight, or in a range of about 10 ppm to about 75 ppm by weight, of the heavy oil and any diluents. In the case where the dispersed metal sulfide catalyst is the only catalyst being employed (e.g., slurry reactor), the concentration will typically be higher, such as in a range of about 30 ppm to about 1000 ppm by weight, or in a range of about 50 ppm to about 500 ppm by weight, or in a range of about 75 ppm to about 300 ppm by weight, of the heavy oil and any diluents.

In the case where the heavy oil includes a significant quantity of asphaltene molecules, the dispersed metal sulfide catalyst particles may preferentially associate with or remain in close proximity to the asphaltene molecules. Asphaltene molecules can have a greater affinity for the metal sulfide catalyst particles since asphaltene molecules are generally more hydrophilic and less hydrophobic than other hydrocarbons contained in heavy oil. Because metal sulfide catalyst particles tend to be hydrophilic, the individual particles or molecules will tend to migrate toward more hydrophilic moieties or molecules within the heavy oil.

While the highly polar nature of metal sulfide catalyst particles causes or allows them to associate with asphaltene molecules, it is the general incompatibility between the highly polar catalyst compounds and hydrophobic heavy oil that necessitates the aforementioned intimate or thorough mixing of catalyst precursor within the feedstock prior to decomposition and formation of the active catalyst particles in situ. Because metal catalyst compounds are highly polar, they cannot be effectively dispersed within heavy oil if added directly. In practical terms, forming smaller active catalyst particles results in a greater number of catalyst particles that provide more evenly distributed catalyst sites throughout the heavy oil. It also increases catalyst surface area.

Thorough mixing of catalyst precursor with the heavy oil feedstock prior to thermal decomposition of the catalyst precursor and formation of dispersed metal sulfide catalyst particles substantially reduces the rate of equipment fouling, which can be measured by at least one of: (i) frequency of required heat exchanger clean-outs; (ii) frequency of switching to spare heat exchangers; (iii) frequency of filter changes; (iv) frequency of strainer clean-outs or changes; (v) rate of decrease in equipment skin temperatures, including in equipment selected from heat exchangers, separators, or distillation towers; (vi) rate of increase in furnace tube metal temperatures; (vii) rate of increase in calculated fouling resistance factors for heat exchangers and furnaces; (viii) rate of increase in differential pressure of heat exchangers; (ix) frequency of cleaning atmospheric and/or vacuum distillation towers; or (x) frequency of maintenance turnarounds.

V. Examples

Comparative Example 1

Molybdenum 2-ethyl hexanoate, which has a decomposition temperature of about 150° C., is used as an oil-soluble catalyst precursor in a heavy oil feedstock. The catalyst precursor is added directly to the feedline for the heavy oil feedstock prior to feeding the heavy oil feedstock into an ebullated bed reactor containing a heterogeneous ebullated bed catalyst. The heavy oil feedstock is at a temperature of about 200° C. at the time of addition of the catalyst precursor and no mixing equipment is used before the heavy oil feedstock is fed into the hydroprocessing reactor.

The catalyst precursor thermally decomposes and forms metal catalyst agglomerations that are 1-300 μm in size. The catalyst agglomerations have low surface area and low catalytic activity. Rather than enhancing the performance of the ebullated bed reactor, they cause additional fouling and sediment formation.

Comparative Example 2

This example is similar to Example 1 except that the catalyst precursor is mixed with the heavy oil feedstock using a series of mixers, including a static in-line mixer and a high shear mixer, followed by a surge tank and pressurizing pumps. Although the catalyst precursor is mixed into the heavy oil feedstock, it thermally decomposes before there is adequate mixing, resulting in the formation of larger catalyst particles that are 1-150 μm in size. The catalyst particles have low surface area and low catalytic activity. Rather than enhancing the performance of the ebullated bed reactor, they cause additional fouling and sediment formation.

Comparative Example 3

Rather than mixing the catalyst precursor directly into the bulk of the heavy oil feedstock, it is first pre-mixed with a side stream (5% by volume) of the heavy oil feedstock as a diluent to form a diluted precursor mixture, which is then mixed into the remainder (95% by volume) of the heavy oil feedstock. Because the side stream of the heavy oil feedstock is at a temperature higher than the decomposition temperature of the catalyst precursor, the catalyst precursor thermally decomposes before it can be adequate mixed throughout the diluent, resulting in the formation of larger catalyst particles that are 1-150 μm in size. The catalyst particles have low surface area and low catalytic activity. Rather than enhancing the performance of the ebullated bed reactor, they cause additional fouling and sediment formation.

Comparative Example 4

Rather than mixing the catalyst precursor directly into the heavy oil feedstock, it is first pre-mixed with a medium boiling hydrocarbon to form a diluted precursor mixture at a temperature below its decomposition temperature. The diluted precursor mixture is then mixed into the heavy oil feedstock to form a conditioned feedstock, which is then heated to decompose the catalyst precursor and form the active metal sulfide catalyst particles in situ. The resulting dispersed metal sulfide catalyst particles are less than 1 μm in size and have good catalytic activity. However, the process of forming the diluted precursor mixture required the use of a valuable hydrocarbon material that is either in short supply, is required for other processes at the refinery, or can be sold for a price that makes it uneconomical to use as a diluent for the catalyst precursor.

Example 5

Rather than pre-mixing the catalyst precursor with a medium boiling hydrocarbon to form a diluted precursor mixture, the catalyst precursor is instead pre-mixed with a side stream (5% by volume) of the heavy oil feedstock as a diluent to form a diluted precursor mixture, which is then mixed into the remainder (95% by volume) of the heavy oil feedstock. Prior to being mixed with the catalyst precursor, the heavy oil feedstock side stream is cooled to a temperature of 150° C., which is near the decomposition temperature of the catalyst precursor and therefore does not cause more than 20% of the catalyst precursor to decompose before it is thoroughly mixed throughout the diluent.

The diluted precursor mixture is mixed into the heavy oil feedstock to form a conditioned feedstock, which is then heated to decompose the catalyst precursor and form the active metal sulfide catalyst particles in situ. The majority of dispersed metal sulfide catalyst particles are less than 1 μm in size and have good catalytic activity.

Example 6

This Example is similar to Example 5, except that prior to being mixed with the catalyst precursor, the heavy oil feedstock side stream is cooled to a temperature of 125° C., which is somewhat below the decomposition temperature of the catalyst precursor and therefore does not cause more than 5% of the catalyst precursor to decompose before it is thoroughly mixed throughout the diluent.

The diluted precursor mixture is mixed into the heavy oil feedstock to form a conditioned feedstock, which is then heated to decompose the catalyst precursor and form the active metal sulfide catalyst particles in situ. The dispersed metal sulfide catalyst particles are less than 1 μm in size and have excellent catalytic activity.

Example 7

This Example is similar to Examples 5 and 6, except that prior to being mixed with the catalyst precursor, the heavy oil feedstock side stream is cooled to a temperature of 75-95° C., which is well below the decomposition temperature of the catalyst precursor and therefore does not cause significant decomposition of the catalyst precursor before it is thoroughly mixed throughout the diluent.

The diluted precursor mixture is mixed into the heavy oil feedstock to form a conditioned feedstock, which is then heated to decompose the catalyst precursor and form the active metal sulfide catalyst particles in situ. The dispersed metal sulfide catalyst particles are less than 1 μm in size and have superior catalytic activity.

Example 8

This Example is similar to Example 7, except that a side stream of the conditioned heavy oil feedstock is used as the high boiling hydrocarbon diluent. The side stream of the conditioned heavy oil feedstock has a temperature of about 225° C. Prior to being mixed with the catalyst precursor, the conditioned feedstock side stream is cooled to a temperature of 75-95° C., which is well below the decomposition temperature of the catalyst precursor and therefore does not cause significant decomposition of the catalyst precursor before it is thoroughly mixed throughout the diluent.

The diluted precursor mixture is mixed into the heavy oil feedstock to form a conditioned feedstock, which is then heated to decompose the catalyst precursor and form the active metal sulfide catalyst particles in situ. The dispersed metal sulfide catalyst particles are less than 1 μm in size and have superior catalytic activity.

Example 9

This Example is similar to Examples 7 and 8, except that a vacuum tower bottoms product is used as the high boiling hydrocarbon diluent. The vacuum tower bottoms product initially has a temperature of about 250° C. Prior to being mixed with the catalyst precursor, the vacuum tower bottoms product is cooled to a temperature of 75-95° C., which is well below the decomposition temperature of the catalyst precursor and therefore does not cause significant decomposition of the catalyst precursor before it is thoroughly mixed throughout the diluent.

The diluted precursor mixture is mixed into the heavy oil feedstock to form a conditioned feedstock, which is then heated to decompose the catalyst precursor and form the active metal sulfide catalyst particles in situ. The dispersed metal sulfide catalyst particles are less than 1 µm in size and have superior catalytic activity.

Example 10

This Example is similar to Examples 7-9, except that a deasphalted oil product is used as the high boiling hydrocarbon diluent. The deasphalted oil product initially has a temperature of about 200° C. Prior to being mixed with the catalyst precursor, the deasphalted oil product is cooled to a temperature of 75-95° C., which is well below the decomposition temperature of the catalyst precursor and therefore does not cause significant decomposition of the catalyst precursor before it is thoroughly mixed throughout the diluent.

The diluted precursor mixture is mixed into the heavy oil feedstock to form a conditioned feedstock, which is then heated to decompose the catalyst precursor and form the active metal sulfide catalyst particles in situ. The dispersed metal sulfide catalyst particles are less than 1 µm in size and have superior catalytic activity.

Example 11

This Example is similar to any of Examples 7-10, except that the high boiling hydrocarbon material is used together with an amount of a medium boiling hydrocarbon material to form a high boiling hydrocarbon diluent mixture. Prior to being mixed with the catalyst precursor, the high boiling hydrocarbon material is cooled to a temperature of 75-95° C., which is well below the decomposition temperature of the catalyst precursor and therefore does not cause significant decomposition of the catalyst precursor before it is thoroughly mixed throughout the diluent.

The diluted precursor mixture is mixed into the heavy oil feedstock to form a conditioned feedstock, which is then heated to decompose the catalyst precursor and form the active metal sulfide catalyst particles in situ. The dispersed metal sulfide catalyst particles are less than 1 µm in size and have superior catalytic activity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of mixing a catalyst precursor into a heavy oil feedstock, comprising:
providing a catalyst precursor having a decomposition temperature;
providing a high boiling hydrocarbon diluent comprised of one or more high boiling hydrocarbons having a nominal boiling point of at least 524° C. and optionally one or more medium boiling hydrocarbons having a nominal boiling point in a range of about 200° C. to 524° C., the high boiling hydrocarbon diluent initially having a temperature above the decomposition temperature of the catalyst precursor;
cooling the high boiling hydrocarbon diluent to a temperature below the decomposition temperature of the catalyst precursor, wherein cooling is performed by at least one of passing the high boiling hydrocarbon diluent through one or more coolers or heat exchangers or mixing the one or more high boiling hydrocarbons with one or more initially cooler medium boiling hydrocarbons;
mixing the catalyst precursor with the high boiling hydrocarbon diluent to form a diluted precursor mixture; and
mixing the diluted precursor mixture with the heavy oil feedstock to form a conditioned feedstock.

2. The method of claim 1, wherein the catalyst precursor has a decomposition temperature in a range of about 150° C. to about 200° C. and the high boiling hydrocarbon diluent is cooled to a temperature of 150° C. or below, or in a range of about 75° C. to about 150° C., or in a range of about 75° C. to about 125° C., or in a range of about 75° C. to about 95° C., prior to mixing the catalyst precursor with the high boiling hydrocarbon diluent.

3. The method of claim 1, wherein the catalyst precursor has a decomposition temperature in a range of about 125° C. to about 150° C. and the high boiling hydrocarbon diluent is cooled to a temperature of 125° C. or below, or in a range of about 75° C. to about 125° C., or in a range of about 75° C. to about 95° C., prior to mixing the catalyst precursor with the high boiling hydrocarbon diluent.

4. The method of claim 1, wherein the high boiling hydrocarbon diluent comprises a portion of the heavy oil feedstock.

5. The method of claim 1, wherein the high boiling hydrocarbon diluent comprises a portion of the conditioned feedstock.

6. The method of claim 1, wherein the high boiling hydrocarbon diluent comprises a vacuum tower bottoms product, optionally recycled vacuum tower bottoms from one or more hydroprocessing reactors that hydroprocess the conditioned feedstock or conversion product thereof.

7. The method of claim 1, wherein the high boiling hydrocarbon diluent comprises a deasphalted oil product.

8. The method of claim 1, wherein the high boiling hydrocarbon diluent comprises a thermal conversion product, optionally visbreaker bottoms.

9. The method of claim 1, wherein the high boiling hydrocarbon diluent has a nominal boiling point of at least about 350° C., or at least about 400° C., or at least about 450° C., or at least about 500° C., or at least about 524° C.

10. The method of claim 1, wherein a portion of the high boiling hydrocarbon diluent comprises a medium boiling hydrocarbon material having a nominal boiling point in a range of about 200° C. to about 524° C.

11. The method of claim 10, wherein the medium boiling hydrocarbon material comprises at least one of vacuum gas oil, decant oil, cycle oil, or atmospheric gas oil.

12. The method of claim 1, wherein the catalyst precursor and high boiling hydrocarbon diluent are mixed using one or more static in-line mixers and optionally one or more high shear mixers.

13. The method of claim 1, wherein the diluted precursor mixture and heavy oil feedstock are mixed using one or more static in-line mixers and one or more high shear mixers.

14. The method of claim 1, further comprising feeding the conditioned feedstock into a surge tank.

15. The method of claim 1, further comprising heating the conditioned feedstock to cause at least a portion of the catalyst precursor to thermally decompose and react with sulfur to form dispersed catalyst sulfide particles in situ within the heavy oil feedstock.

16. A method of mixing a catalyst precursor into a heavy oil feedstock, comprising:
providing a catalyst precursor having a decomposition temperature;
providing a high boiling hydrocarbon diluent comprised of one or more high boiling hydrocarbons having a nominal boiling point of at least 524° C., the high boiling hydrocarbon diluent initially having a temperature above the decomposition temperature of the catalyst precursor;
cooling the high boiling hydrocarbon diluent to a temperature below the decomposition temperature of the catalyst precursor, wherein cooling is performed at least in part by passing the high boiling hydrocarbon diluent through one or more coolers or heat exchangers;
mixing the catalyst precursor with the high boiling hydrocarbon diluent to form a diluted precursor mixture; and
mixing the diluted precursor mixture with the heavy oil feedstock to form a conditioned feedstock.

17. The method of claim 16, wherein the high boiling hydrocarbon diluent further comprises one or more medium boiling hydrocarbons having a nominal boiling point in a range of about 200° C. to 524° C., and wherein cooling is performed in part by mixing the one or more high boiling hydrocarbons with one or more initially cooler medium boiling hydrocarbons.

18. The method of claim 16, wherein the high boiling hydrocarbon diluent comprises at least one of a portion of the heavy oil feedstock or a portion of the conditioned feedstock.

19. The method of claim 16, wherein the high boiling hydrocarbon diluent comprises a vacuum tower bottoms product, including recycled vacuum tower bottoms from one or more hydroprocessing reactors that hydroprocess the conditioned feedstock or conversion product thereof.

20. The method of claim 16, wherein the catalyst precursor has a decomposition temperature in a range of about 150° C. to about 200° C. and the high boiling hydrocarbon diluent is cooled to a temperature of 150° C. or below, or in a range of about 75° C. to about 150° C., or in a range of about 75° C. to about 125° C., or in a range of about 75° C. to about 95° C., prior to mixing the catalyst precursor with the high boiling hydrocarbon diluent.

21. A method of mixing a catalyst precursor into a heavy oil feedstock, comprising:
providing a catalyst precursor having a decomposition temperature;
providing a high boiling hydrocarbon diluent initially having a temperature above the decomposition temperature of the catalyst precursor and being comprised of:
one or more high boiling hydrocarbons having a nominal boiling point of at least 524° C. selected from the group consisting of a portion of the heavy oil feedstock, a portion of the conditioned feedstock, a vacuum tower bottoms product, recycled vacuum tower bottoms from one or more hydroprocessing reactors that hydroprocess the conditioned feedstock or conversion product thereof, a deasphalted oil product, a thermal conversion product, and visbreaker bottoms; and
one or more medium boiling hydrocarbons having a nominal boiling point in a range of about 200° C. to 524° C. selected from the group consisting of vacuum gas oil, decant oil, cycle oil, and atmospheric gas oil;
cooling the high boiling hydrocarbon diluent to a temperature below the decomposition temperature of the catalyst precursor, wherein cooling is performed at least in part by mixing the one or more high boiling hydrocarbons with one or more initially cooler medium boiling hydrocarbons;
mixing the catalyst precursor with the high boiling hydrocarbon diluent to form a diluted precursor mixture; and
mixing the diluted precursor mixture with the heavy oil feedstock to form a conditioned feedstock.

22. The method of claim 21, wherein cooling is performed in part by passing the high boiling hydrocarbon diluent through one or more coolers or heat exchangers.

23. The method of claim 21, wherein the catalyst precursor has a decomposition temperature in a range of about 125° C. to about 150° C. and the high boiling hydrocarbon diluent is cooled to a temperature of 125° C. or below, or in a range of about 75° C. to about 125° C., or in a range of about 75° C. to about 95° C., prior to mixing the catalyst precursor with the high boiling hydrocarbon diluent.

* * * * *